(12) United States Patent
Zeng et al.

(10) Patent No.: US 11,344,954 B2
(45) Date of Patent: May 31, 2022

(54) CHUCK WITH AUTOMATIC JAW ADJUSTMENT

(71) Applicants: APEX BRANDS, INC., Apex, NC (US); Jacobs Chuck Manufacturing Company, Ltd., Suzhou (CN)

(72) Inventors: Tingwei Zeng, Suzhou (CN); Jinping He, Suzhou (CN); Jie Zhang, Suzhou (CN); Zhou Jichun, Suzhou (CN)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 16/982,750

(22) PCT Filed: Mar. 21, 2018

(86) PCT No.: PCT/CN2018/079881
§ 371 (c)(1),
(2) Date: Sep. 21, 2020

(87) PCT Pub. No.: WO2019/178777
PCT Pub. Date: Sep. 26, 2019

(65) Prior Publication Data
US 2021/0008639 A1 Jan. 14, 2021

(51) Int. Cl.
*B23B 31/12* (2006.01)
(52) U.S. Cl.
CPC ........ *B23B 31/1238* (2013.01); *B23B 31/123* (2013.01); *B23B 31/1253* (2013.01); *B23B 2260/136* (2013.01)
(58) Field of Classification Search
CPC .............. B23B 31/1238; B23B 31/123; B23B 2260/136; B23B 31/1253; B23B 31/1207
(Continued)

(56) References Cited

U.S. PATENT DOCUMENTS 3,807,745 A 4/1974 Bent
3,861,693 A * 1/1975 Huber ................. B23B 31/1238
279/61

(Continued)

FOREIGN PATENT DOCUMENTS

CN 105033298 A 11/2015
CN 205629476 U 10/2016
(Continued)

OTHER PUBLICATIONS

Office Action from related U.S. Appl. No. 16/982,742, dated Feb. 2, 2021, all pages cited in its entirety.
(Continued)

*Primary Examiner* — Eric A. Gates
*Assistant Examiner* — Paul M Janeski
(74) *Attorney, Agent, or Firm* — Burr & Forman LLP

(57) ABSTRACT

Various chucks for use with a power driver having a rotatable drive spindle are provided. One chuck includes a plurality of jaws disposed at a forward end of the chuck, a body, a push plate, a jaw spring, and a nut. The plurality of jaws may be disposed in the body and configured to rotate with the body about a center axis of the chuck. The push plate may be operably coupled to each of the jaws. The jaws may be configured to translate forward to close the jaw opening in response to the push plate translating axially forward. The jaw spring may be configured to apply a forward directed force to urge the push plate forward. The nut may have nut teeth that cause the jaws to translate forward and clamp onto the working bit in response to the nut being rotated in a tightening direction.

20 Claims, 21 Drawing Sheets

(58) Field of Classification Search
USPC .................................................. 279/60–65
See application file for complete search history.

(56) References Cited

U.S. PATENT DOCUMENTS

| | | | |
|---|---|---|---|
| 6,260,857 B1 * | 7/2001 | Wienhold | B23B 31/1238 279/140 |
| 7,654,539 B2 | 2/2010 | Yang et al. | |
| 7,946,594 B2 | 5/2011 | Tan | |
| 8,141,883 B2 | 3/2012 | Hu et al. | |
| 9,718,135 B2 * | 8/2017 | Schenk | B23B 31/1238 |
| 2012/0256380 A1 * | 10/2012 | Thorson | B23B 31/123 279/46.7 |
| 2013/0264781 A1 | 10/2013 | Mason | |
| 2017/0203372 A1 * | 7/2017 | Dedrickson | B23B 31/1215 |

FOREIGN PATENT DOCUMENTS

| | | |
|---|---|---|
| CN | 107020396 A | 8/2017 |
| WO | 2017024544 A1 | 2/2017 |

OTHER PUBLICATIONS

International Search Report and Written Opinion from International Application No. PCT/CN2018/079881 filed on Mar. 21, 2018.
Office Action from related U.S. Appl. No. 16/982,742, all pages cited in its entirety.

* cited by examiner

CHUCK WITH AUTOMATIC JAW ADJUSTMENT

TECHNICAL FIELD

Example embodiments generally relate to chucks for use with power drivers including drills, and more particularly, relate to chucks with auto-actuating jaws.

BACKGROUND

Power drivers with rotating drive spindles are often operably coupled to a chuck that is adjustable in size to be able to attach to various working bits, such as drill bits or other tools that are rotated with the chuck by the drive spindle. Conventional chucks typically employ moveable jaws that are operable to adjust the diameter of an opening in the chuck for receiving a working bit. The jaws may be adjusted by rotating an external sleeve to change the size of the opening between the jaws for receiving the working bit. For most conventional chucks, numerous turns of the sleeve may be required to move the jaws between an open position and a closed position to secure the jaws around a working bit. Since numerous turns of the sleeve are often required and to transition the jaws between open and closed positions when installing or removing a working bit, many conventional chucks introduce inefficiencies and excessive downtime for the power driver while changing working bits, particularly when turning the sleeve by hand.

SUMMARY OF SOME EXAMPLES

According to some example embodiments, a chuck is provided for use with a power driver having a rotatable drive spindle. The chuck may comprise a plurality of jaws disposed at a forward end of the chuck. The jaws may define a jaw opening between the jaws for receiving a working bit. The chuck may further include a body. In this regard, the plurality of jaws may be disposed in respective passageways in the body and configured to rotate with the body about a center axis of the chuck. The chuck may further include a push plate operably coupled to each of the jaws. The jaws may be configured to translate forward in the respective passageways to close the jaw opening in response to the push plate translating axially forward. The chuck may further include a jaw spring configured to apply a forward directed force to urge the push plate forward. The chuck may also include a sleeve and a nut. The nut may include nut teeth configured to be engagable in a helically threaded coupling. The sleeve may be configured to cause the nut to rotate in a tightening direction in response to the sleeve being rotated in the tightening direction and the nut being rotationally engaged with the sleeve. Further, the nut may be configured to cause the jaws to translate forward and clamp onto the working bit in response to the nut being rotated in the tightening direction.

According to some example embodiments, another chuck for use with a power driver having a rotatable drive spindle is provided. The chuck may comprise a plurality of jaws disposed at a forward end of the chuck. The jaws may define a jaw opening between the jaws for receiving a working bit. The chuck may additional include a body comprising groupings of body teeth and a body teeth channel extending parallel to a center axis of the chuck and disposed between groupings of the body teeth. The plurality of jaws may be disposed in respective passageways in the body and configured to rotate with the body about the center axis. The chuck may also include a nut comprising groupings of nut teeth and a nut teeth channel disposed between the groupings of nut teeth. The nut teeth channel may extend parallel to the center axis. The chuck may also include a push plate operably coupled to the nut and to each of the jaws. The jaws may be configured to translate forward in the passageways to close the jaw opening in response to the push plate translating axially forward. Further, the chuck may include a jaw spring configured to apply a forward directed force to urge the push plate forward. The groupings of nut teeth may be configured to be engaged in a helically threaded coupling with the groupings of body teeth in response to rotation of the nut in a tightening direction which causes the nut to translate axially forward with the push plate to cause the jaws to translate forward and clamp onto the working bit.

According to some additional embodiments, another chuck for use with a power driver having a rotatable drive spindle may be provided. The chuck may comprise a plurality of jaws disposed at a forward end of the chuck. The jaws may define a jaw opening between the jaws for receiving a working bit. Each jaw may comprise jaw teeth. The chuck may also include a body. The plurality of jaws may be disposed in respective passageways in the body and configured to rotate with the body about a center axis of the chuck. The chuck may also include a push plate operably coupled to each of the jaws. The jaws may be configured to translate forward in the respective passageways of the body to close the jaw opening in response to the push plate translating axially forward. Further, the chuck may comprise a jaw spring configured to apply a forward directed force to urge the push plate forward, and a nut having nut teeth, the nut being configured to translate axially between a disengaged position and an engaged position. In the disengaged position, the nut teeth may be disengaged from the jaw teeth to permit the jaws to translate forward and close the jaw opening in response to the forward directed force applied by the jaw spring on the push plate. In the engaged position, the nut teeth may be engaged in a helically threaded coupling with jaw teeth such that rotation of the nut in the tightening direction causes the jaws to translate forward and clamp onto the working bit.

BRIEF DESCRIPTION OF THE DRAWINGS

Figure 1:
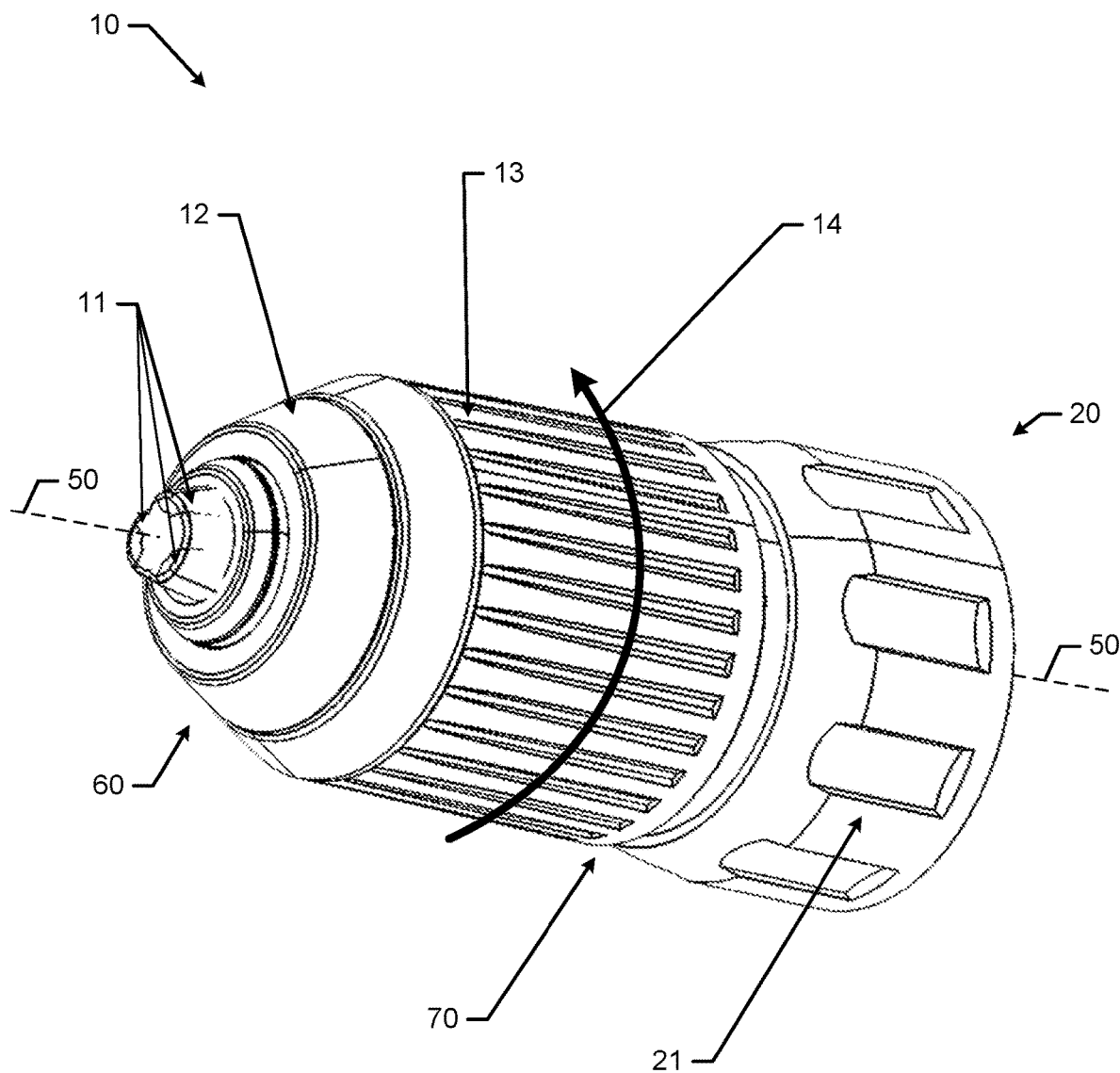
Figure 2:
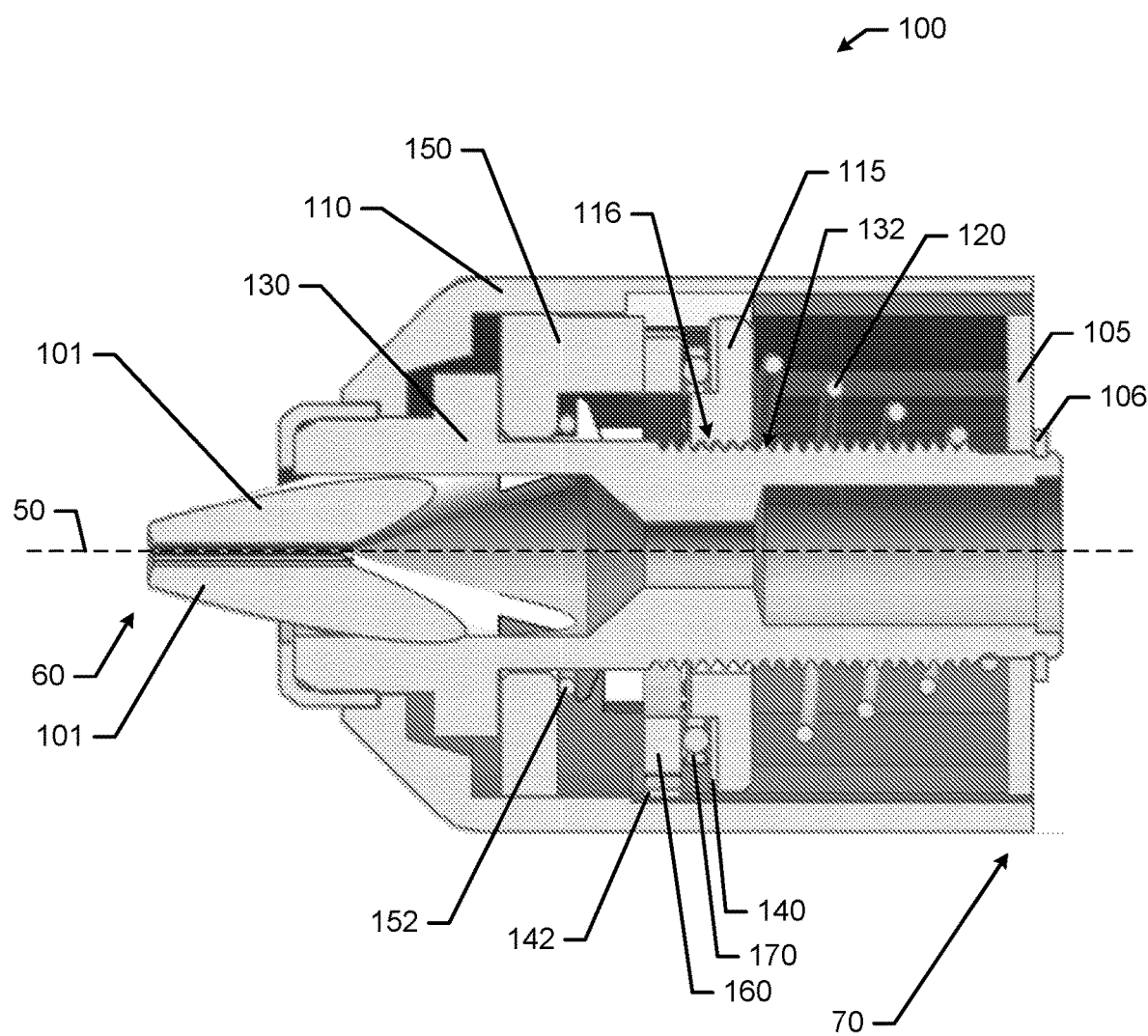
Figure 3:
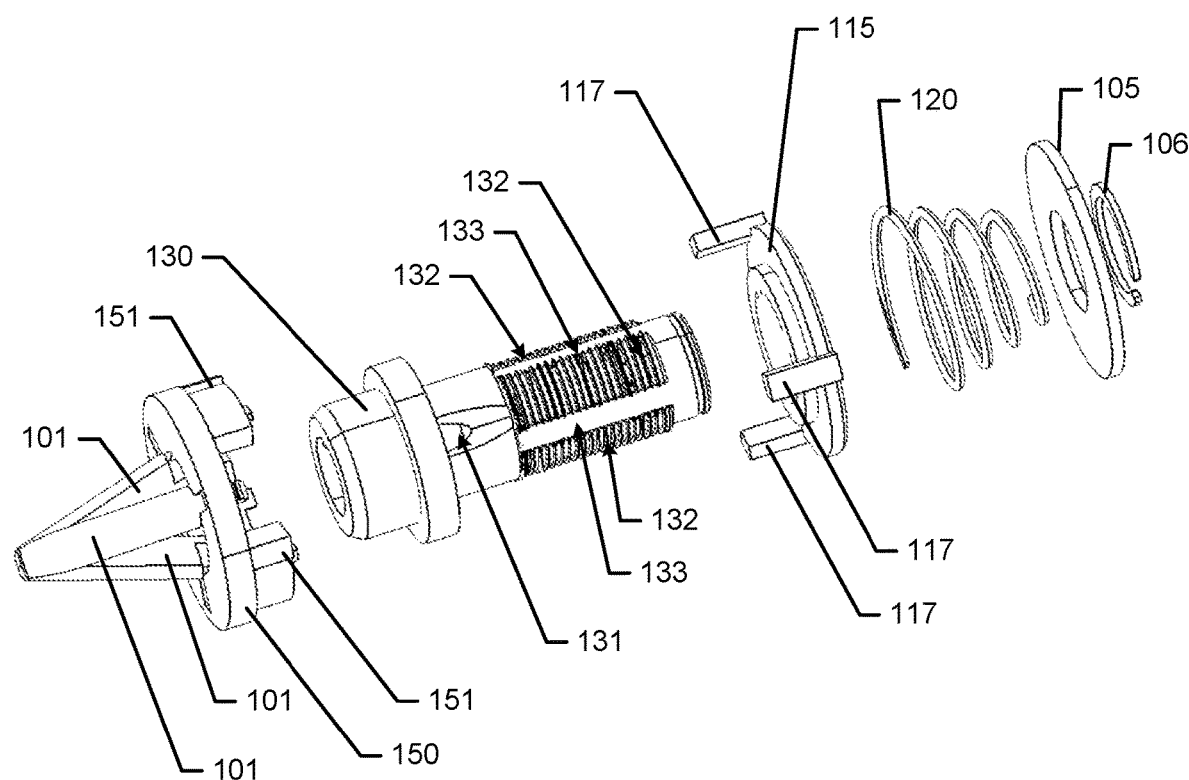
Figure 4:
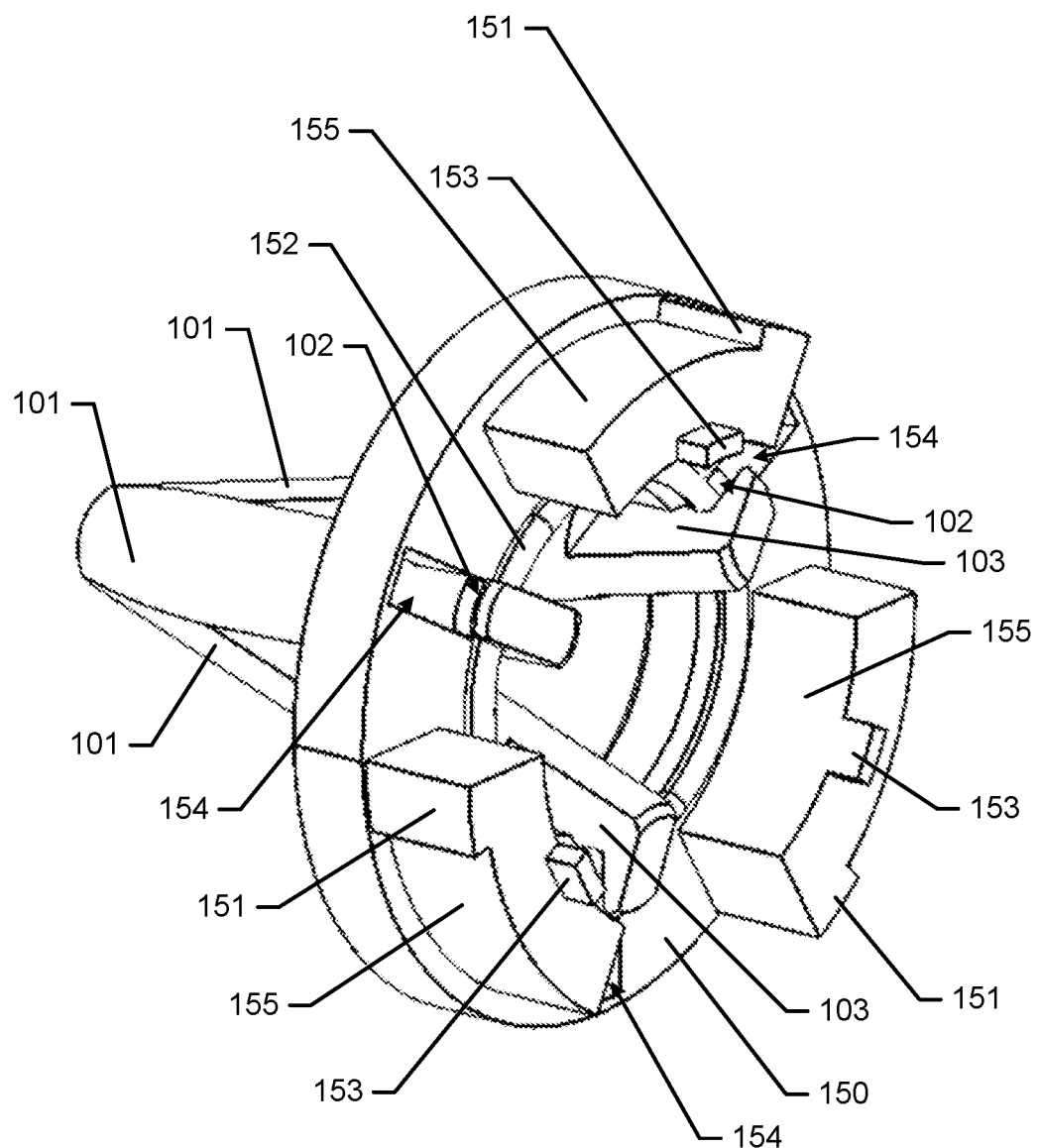
Figure 5:
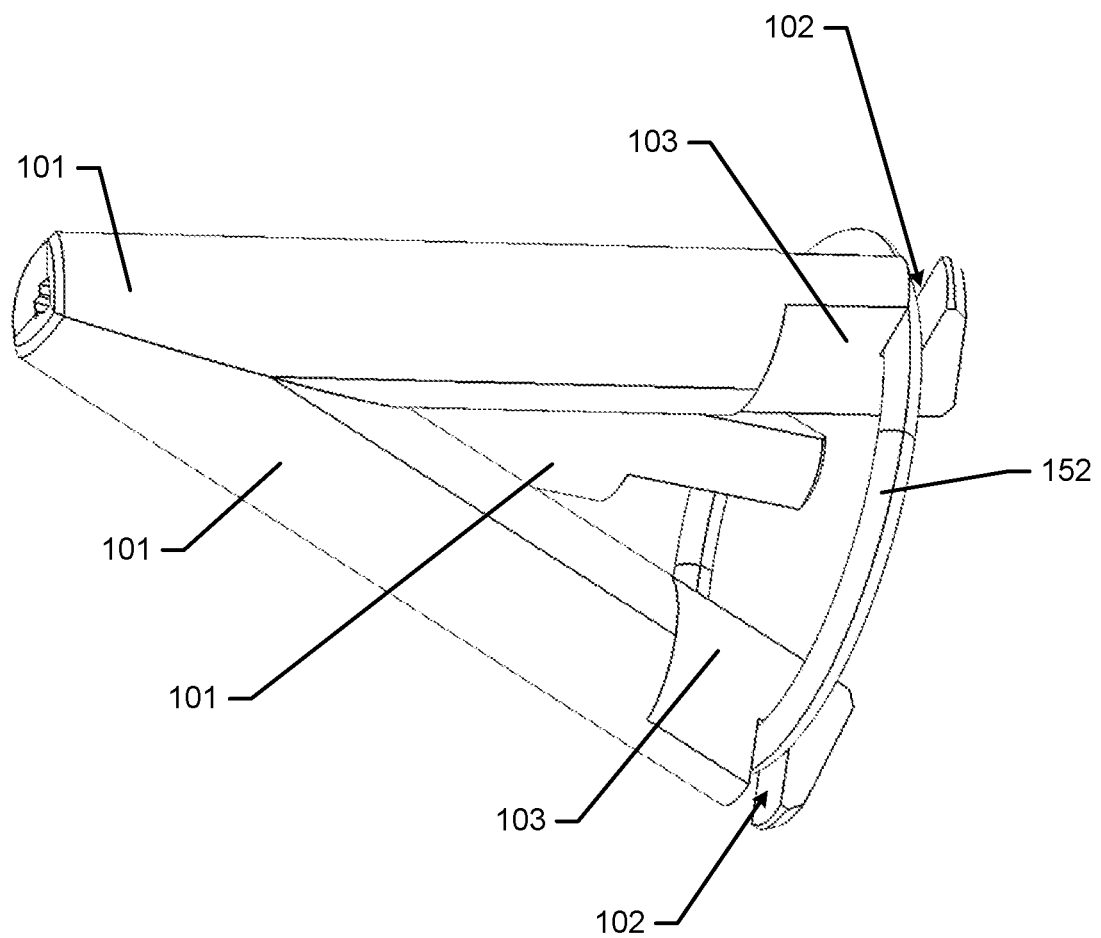
Figure 6:
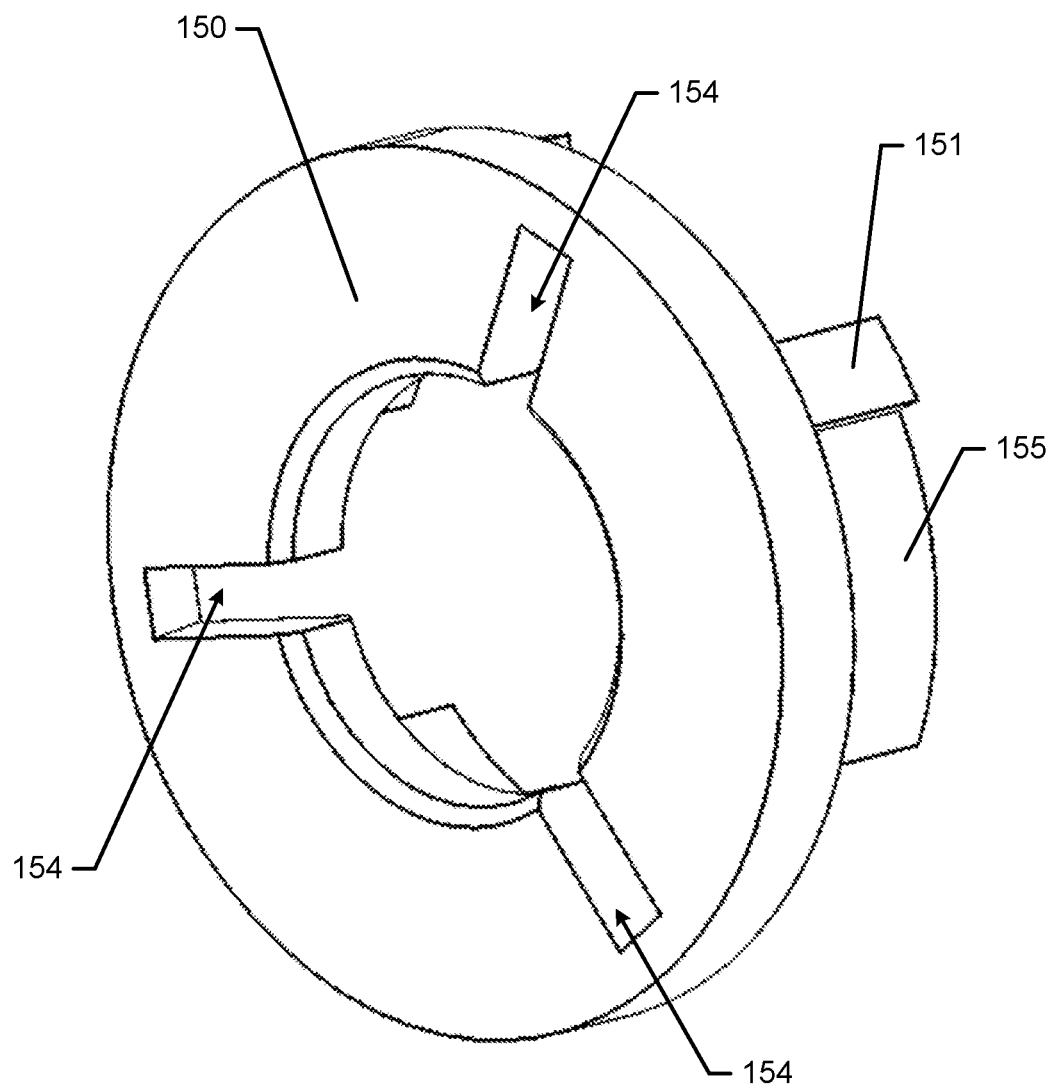
Figure 7:
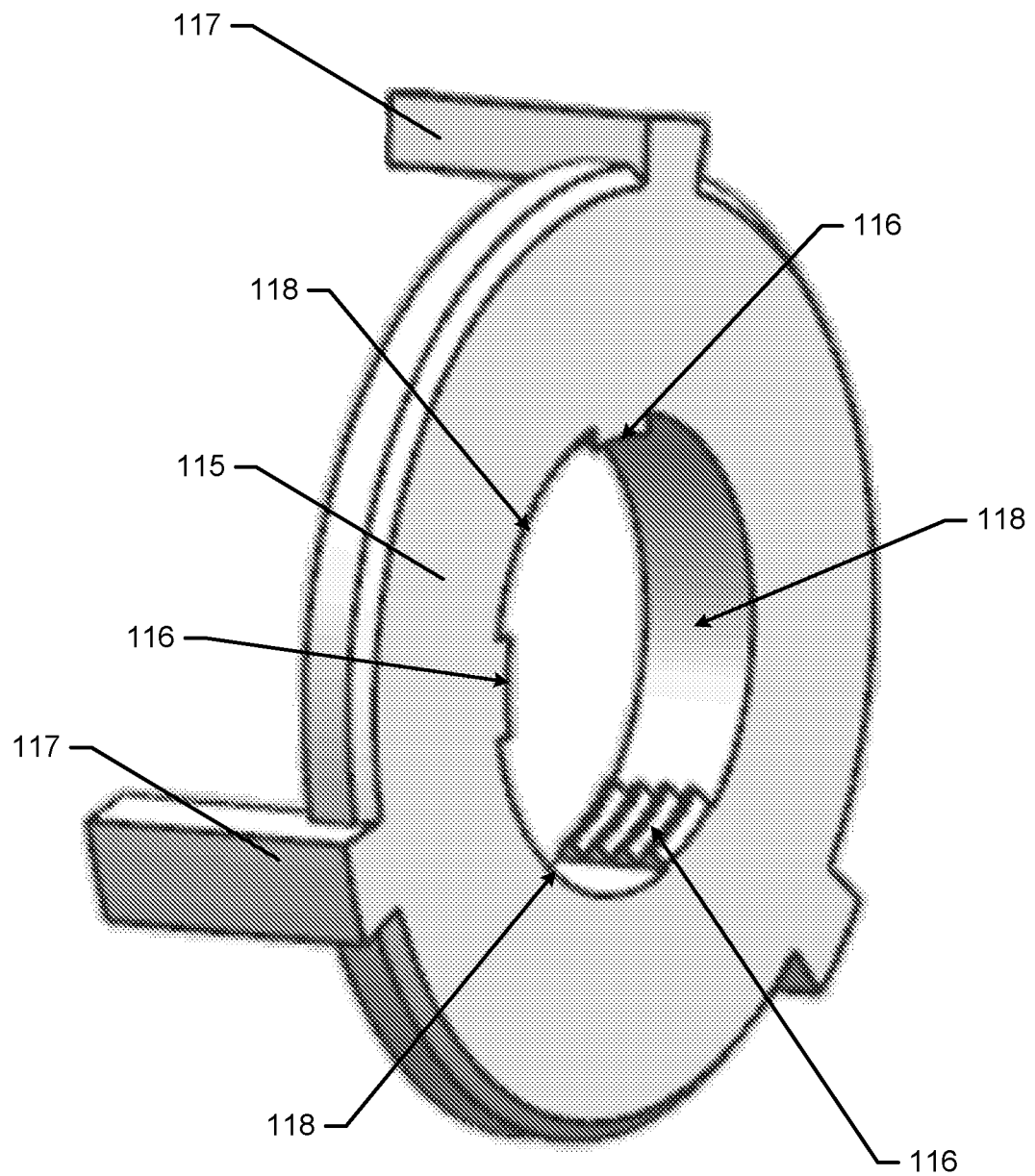
Figure 8:
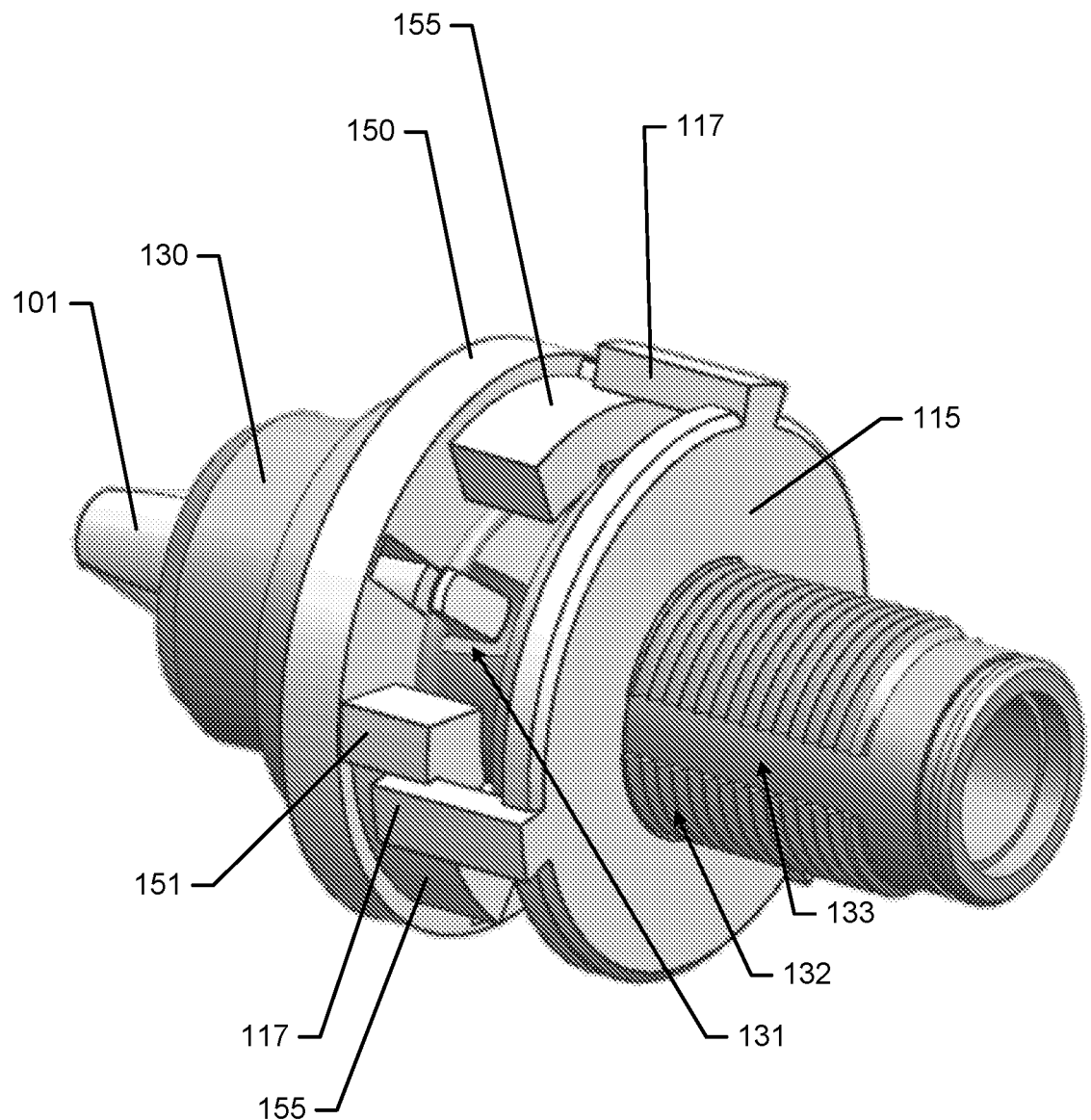
Figure 9:
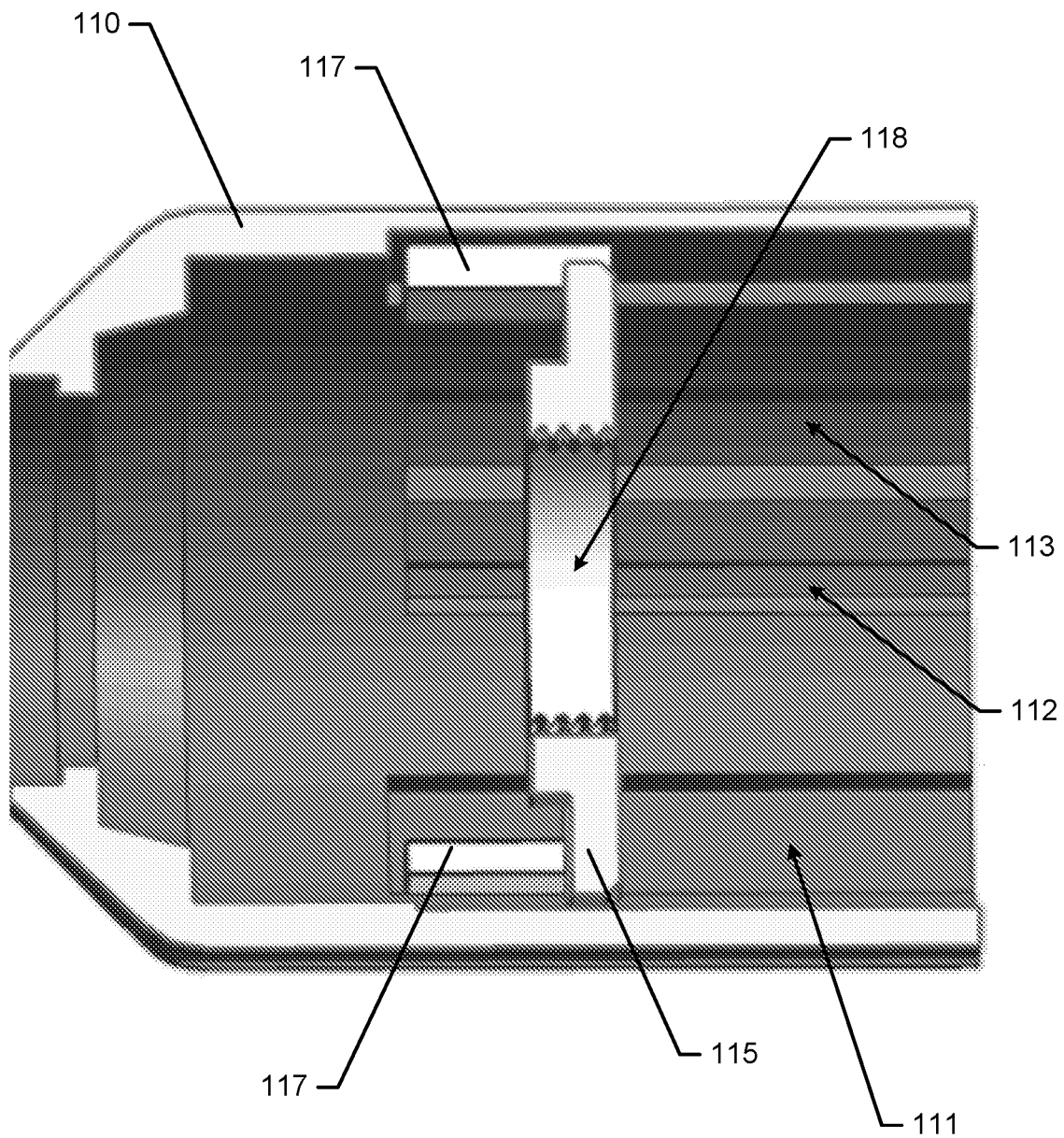
Figure 10:
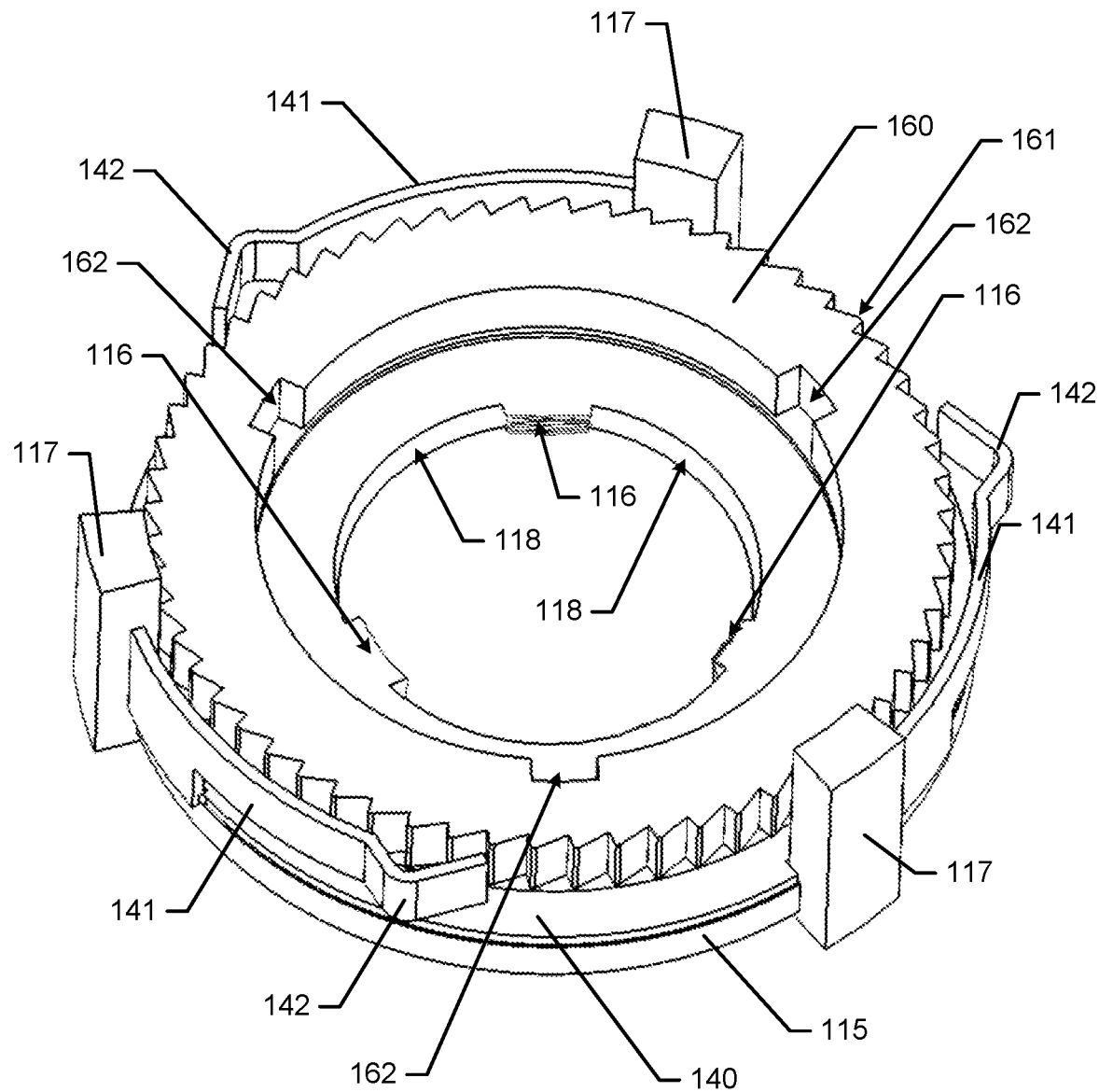
Figure 11:
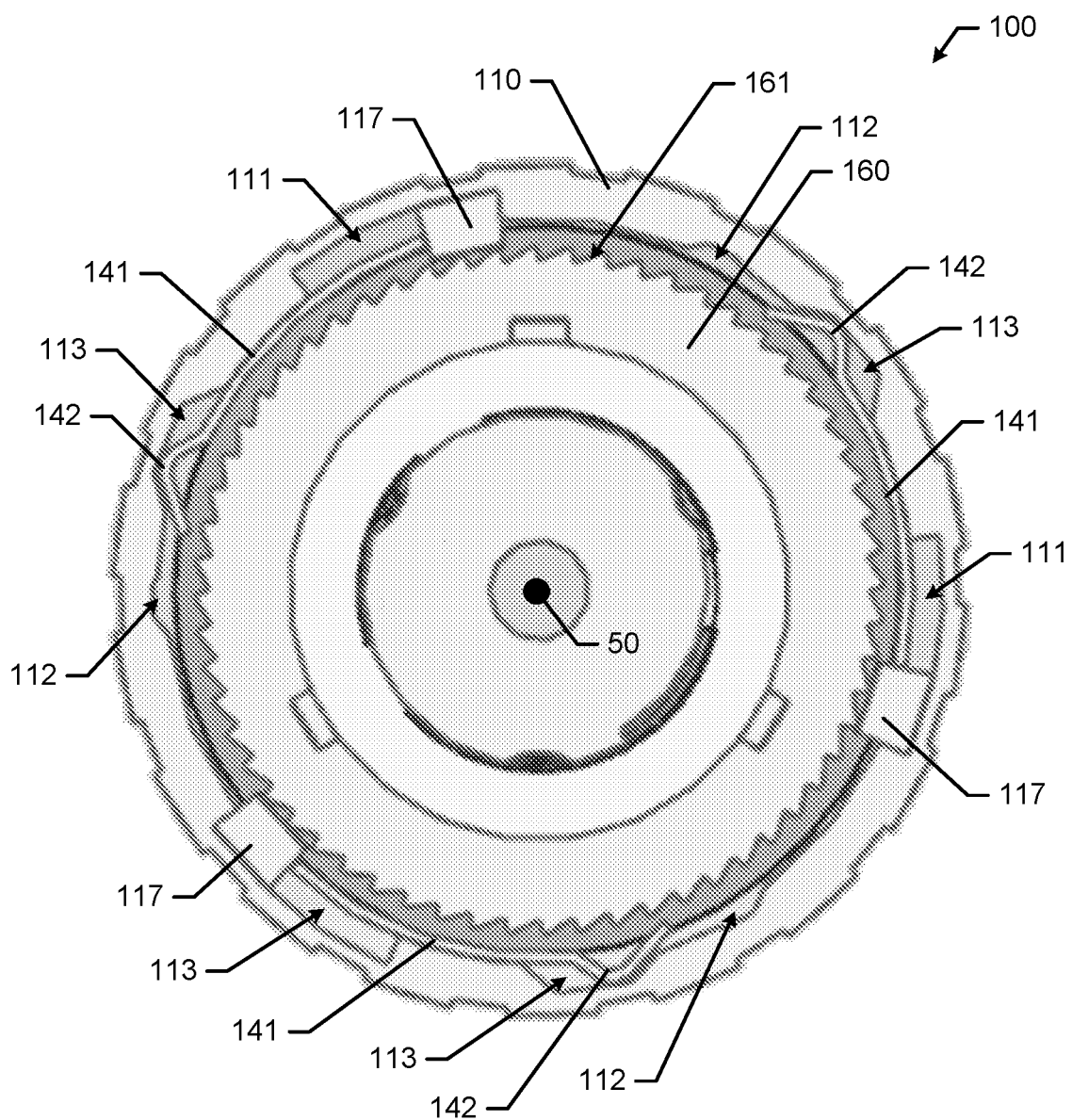
Figure 12:
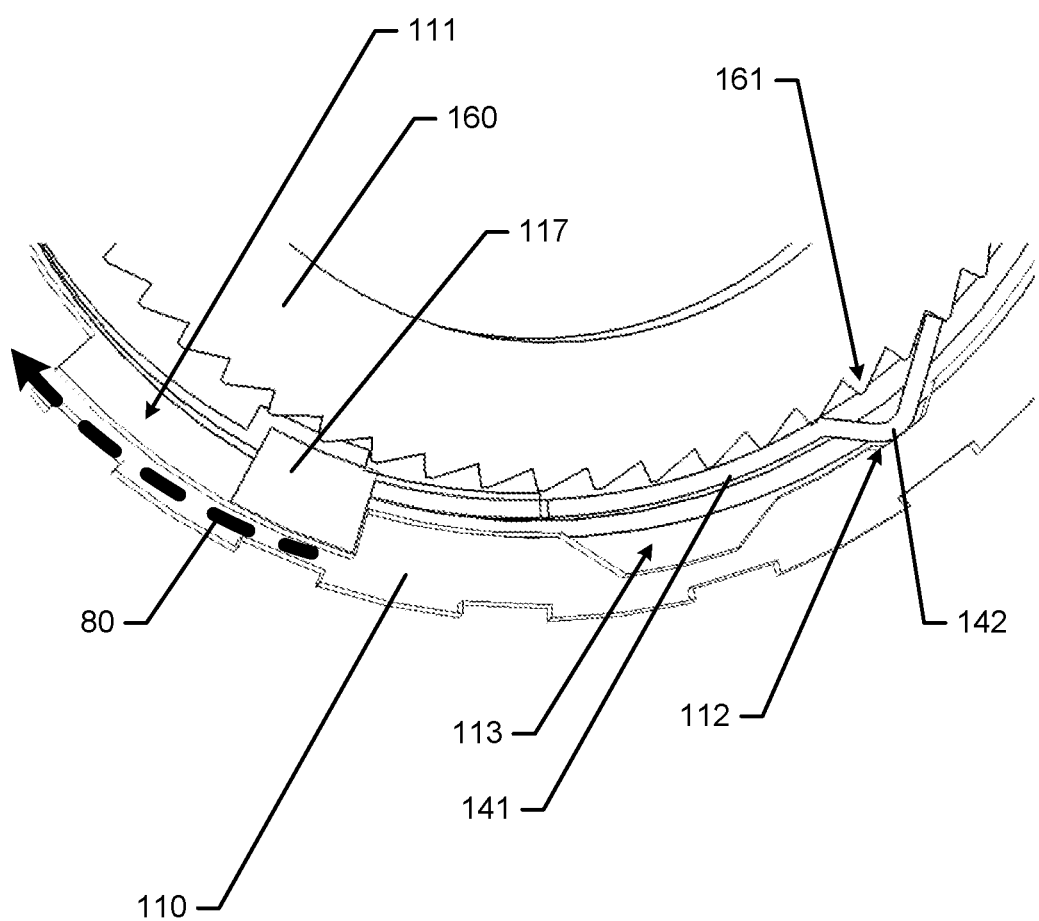
Figure 13:
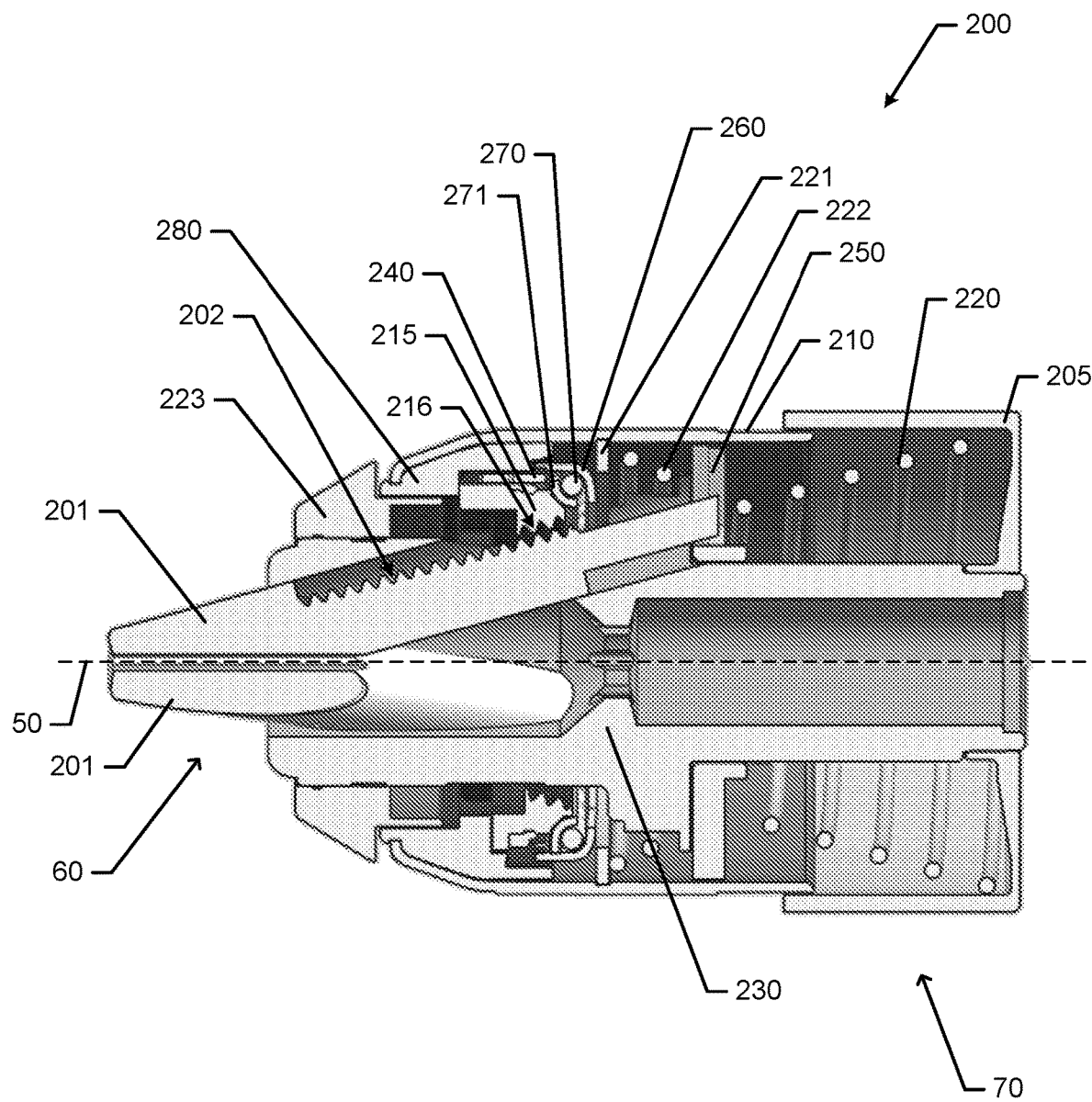
Figure 14:
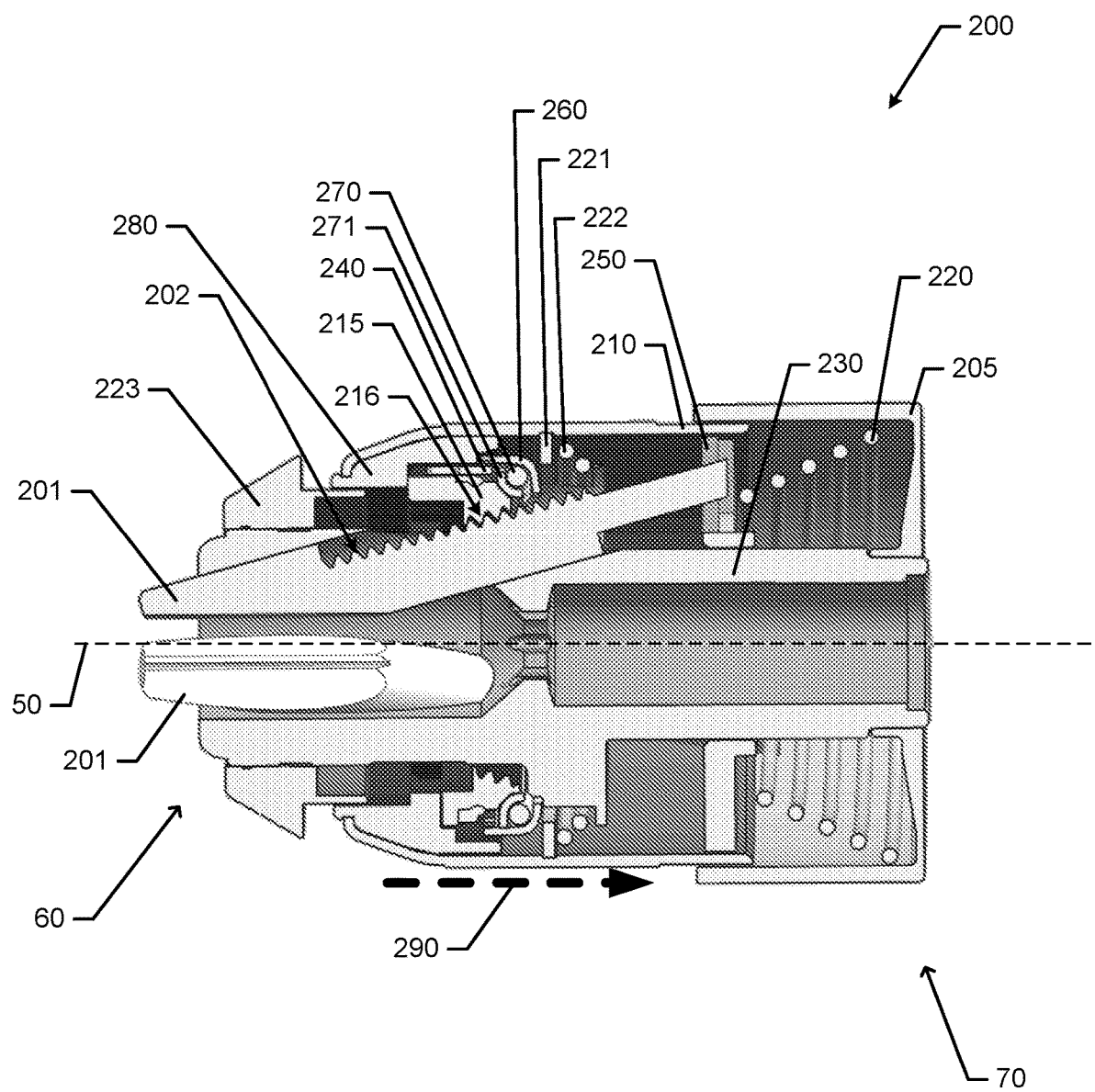
Figure 15:
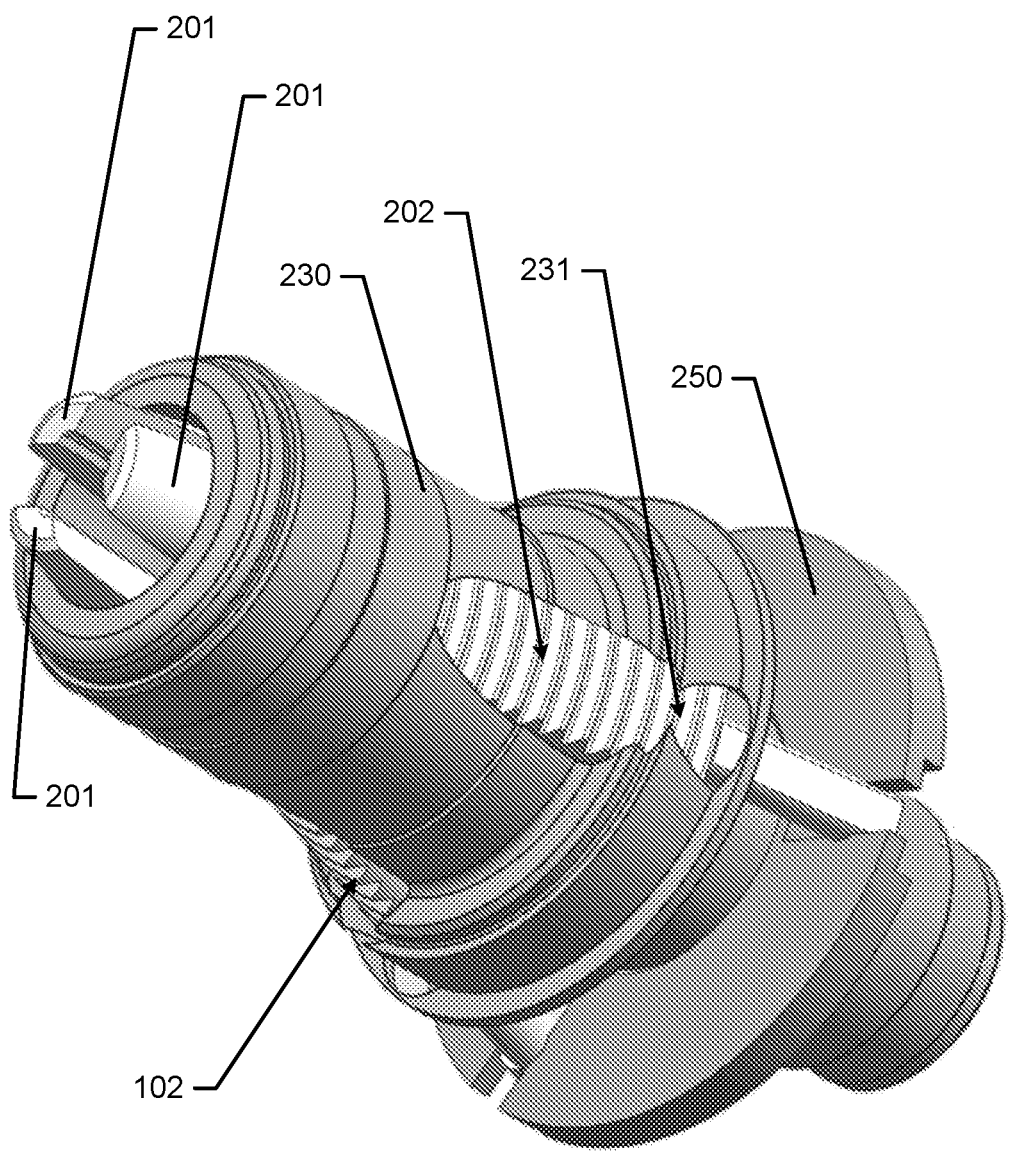
Figure 16:
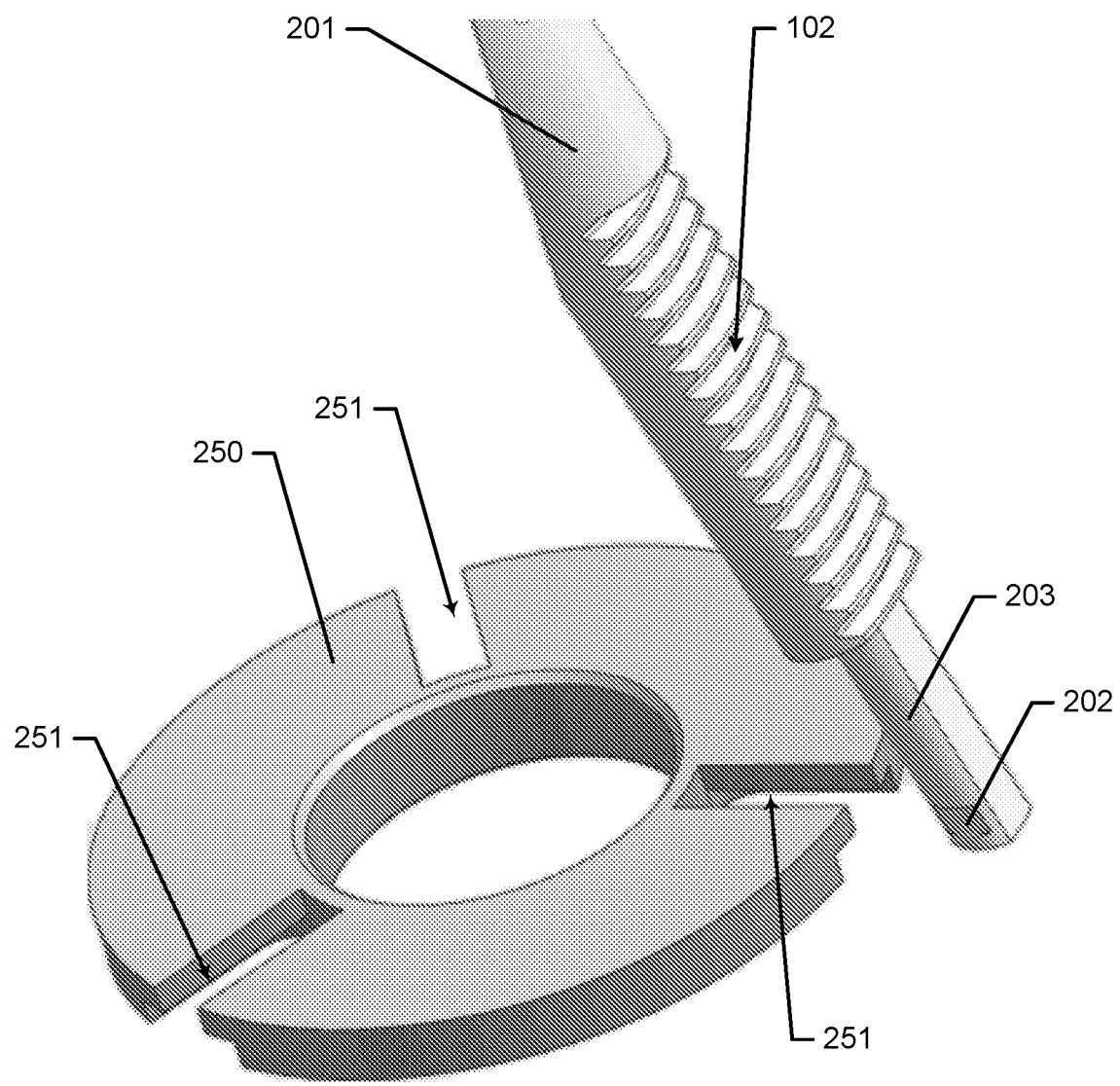
Figure 17:
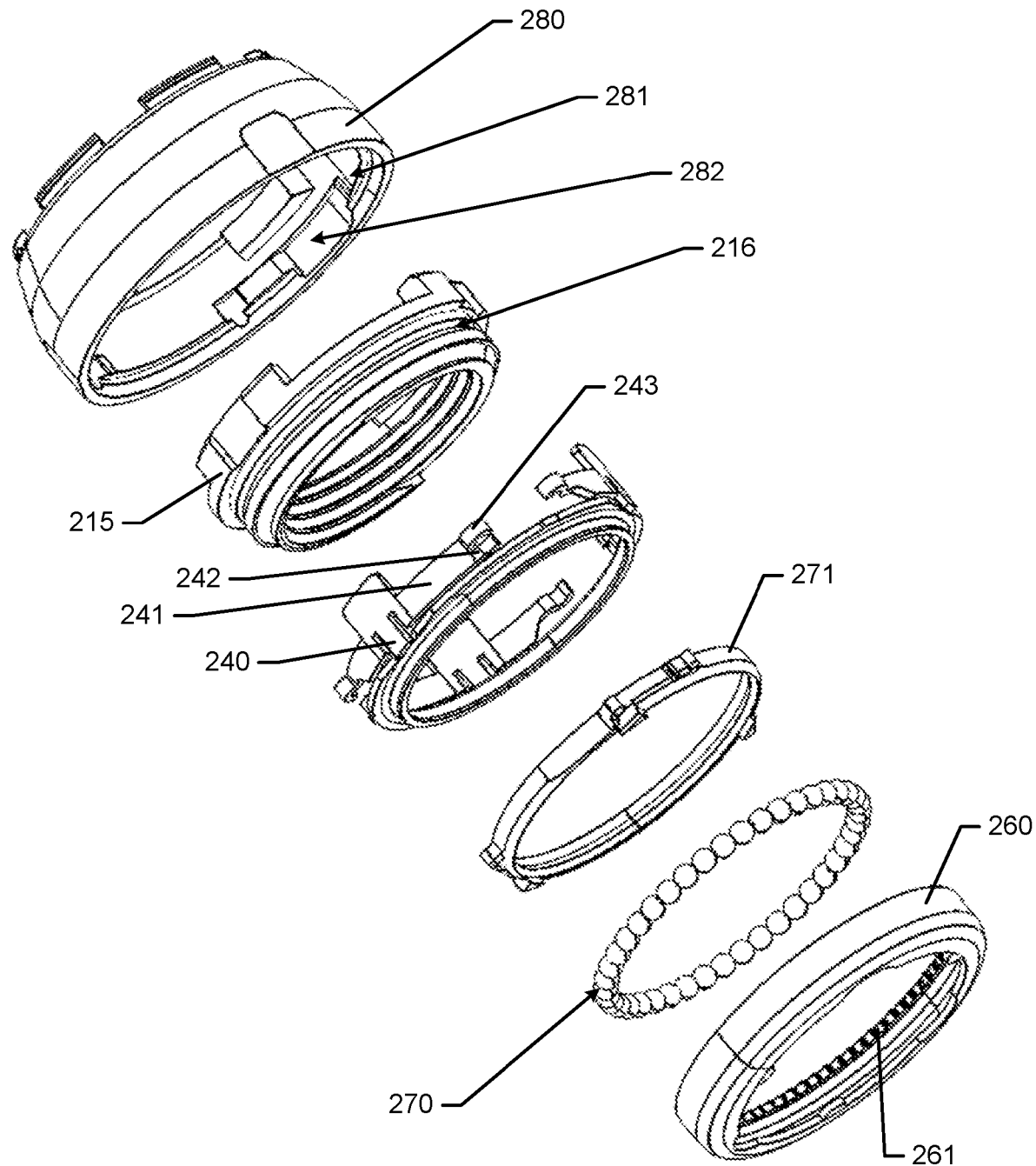
Figure 18:
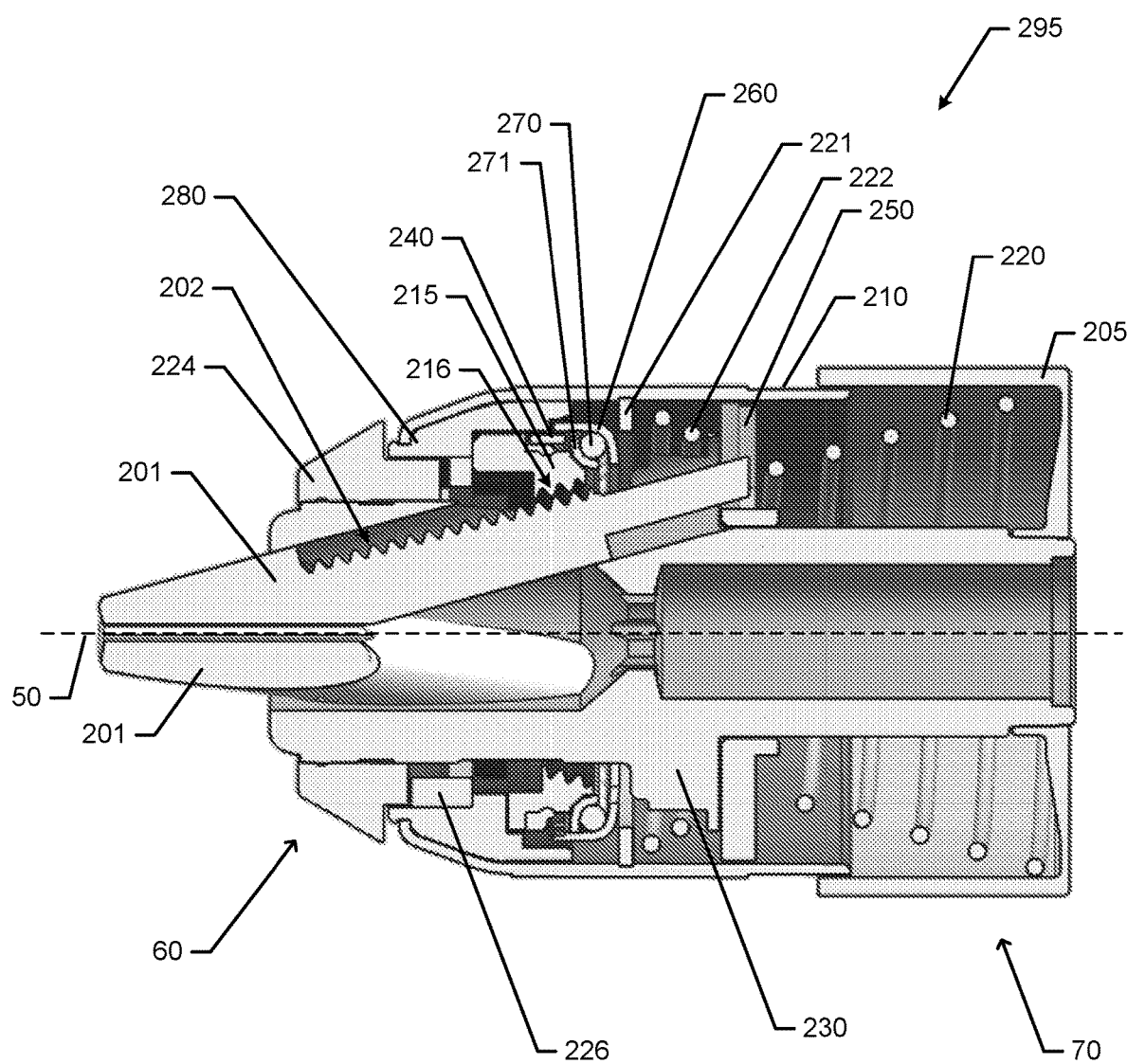
Figure 19:
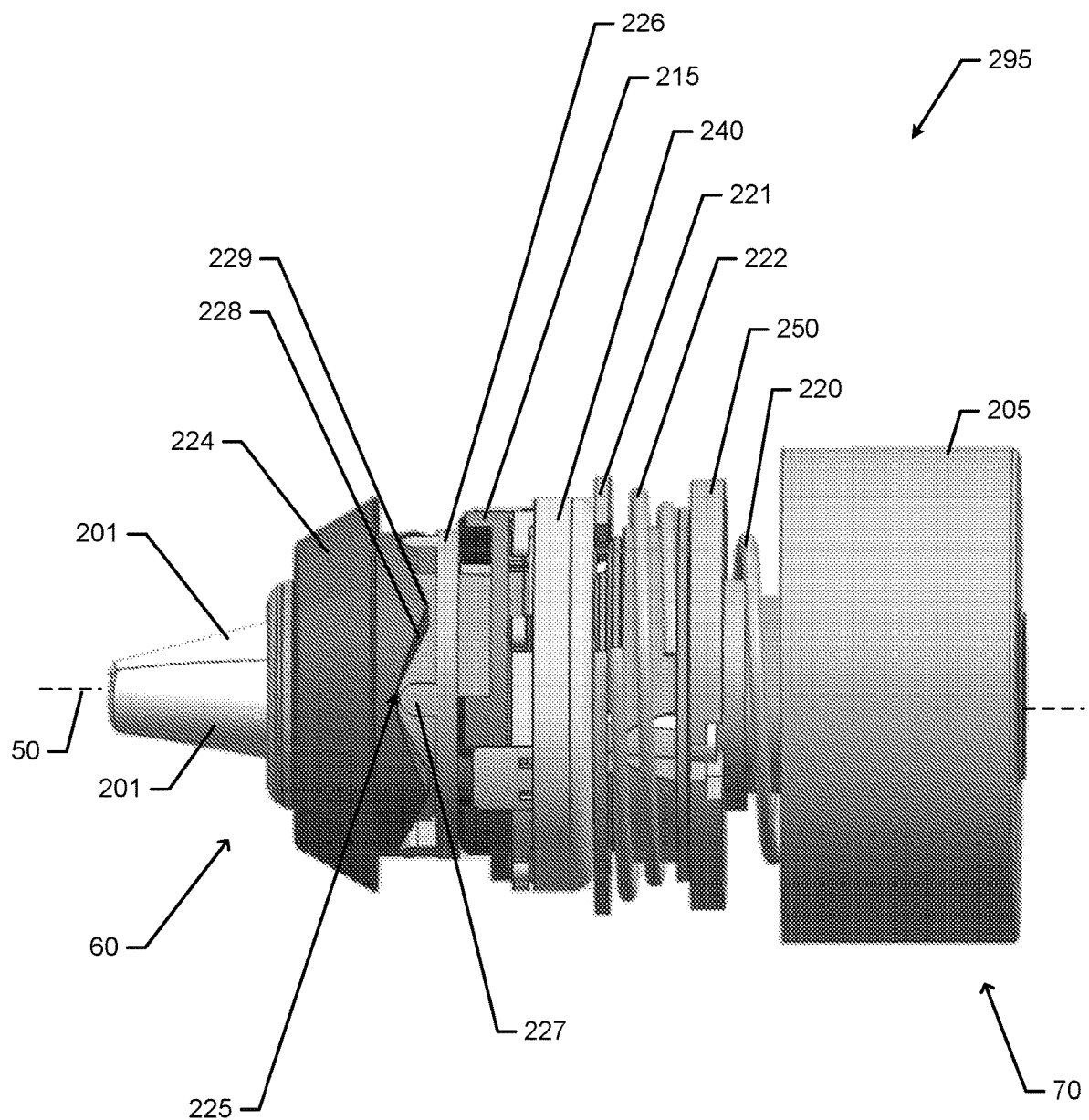
Figure 20:
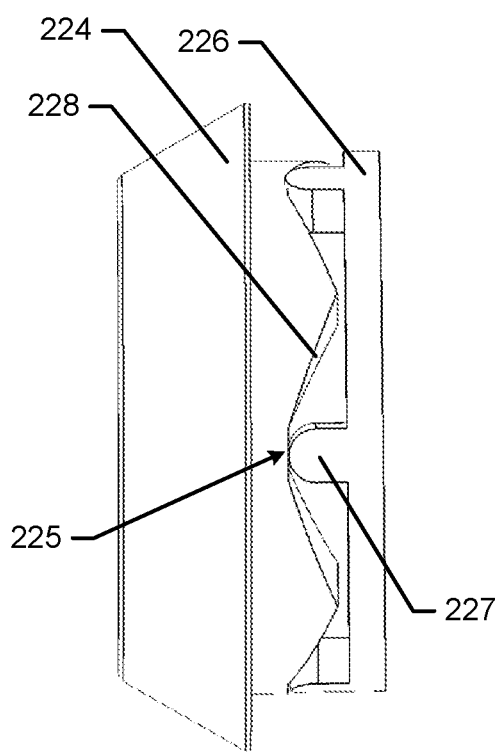
Figure 21:
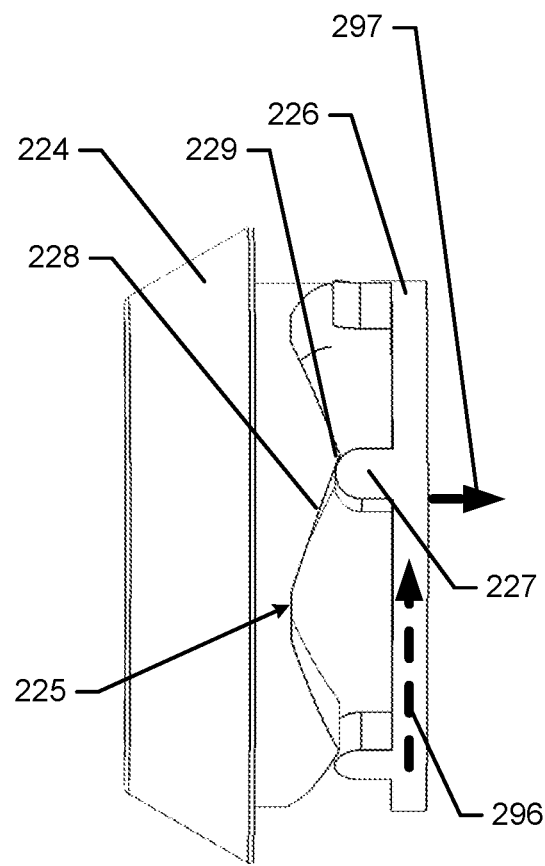
Figure 22:
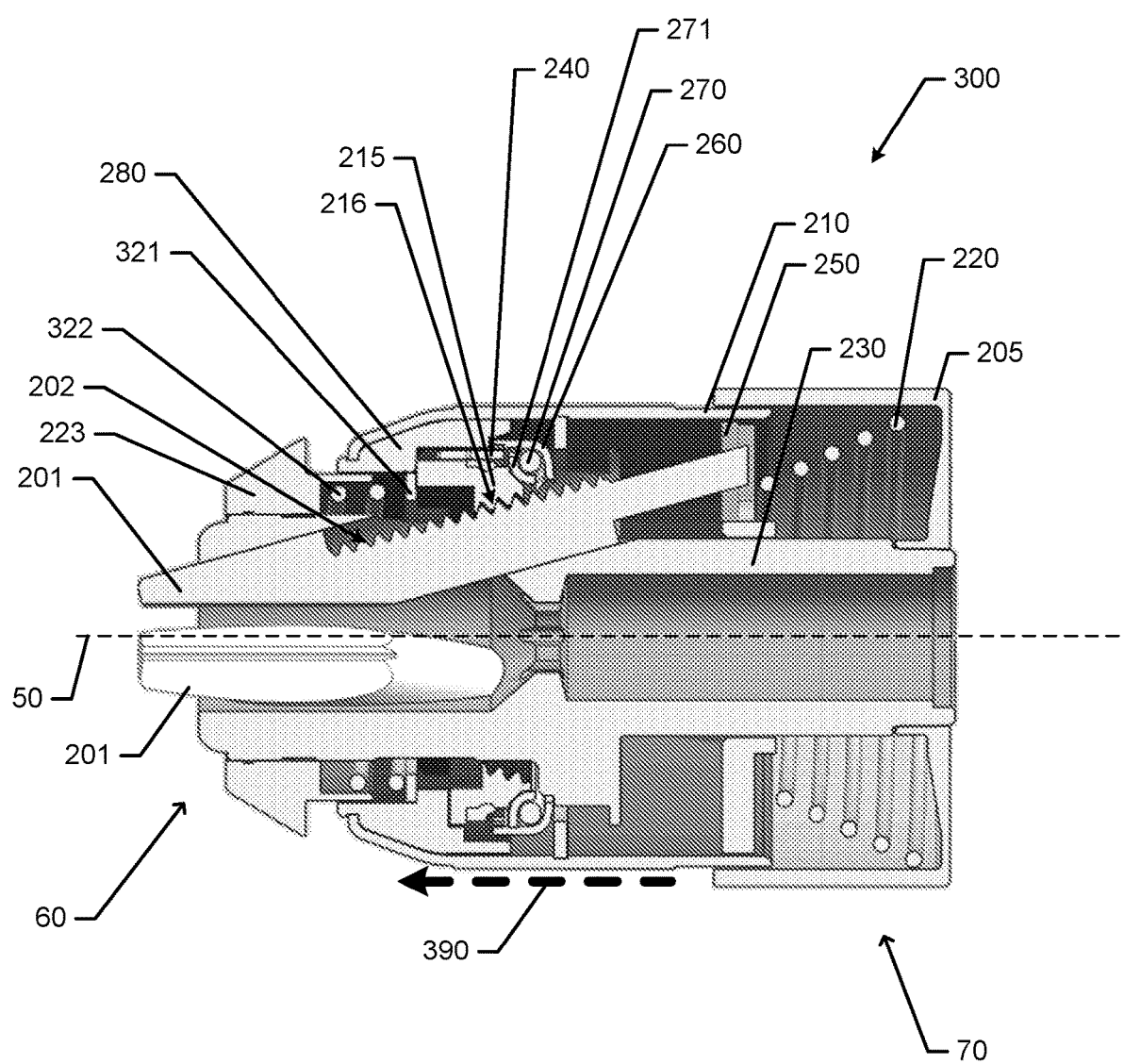

Having thus described some example embodiments in general terms, reference will now be made to the accompanying drawings, which are not necessarily drawn to scale, and wherein:

FIG. 1 illustrates a perspective side view of a chuck in accordance with an example embodiment;

FIG. 2 illustrates cross-section side view of a chuck in accordance with an example embodiment;

FIG. 3 illustrates a perspective exploded view of components of the chuck of FIG. 2 including a jaws, a push plate, a body, a nut, and a jaw spring in accordance with an example embodiment;

FIG. 4 illustrates a perspective view of jaws and a push plate of the chuck of FIG. 2 in accordance with an example embodiment;

FIG. 5 illustrates a perspective side view of jaws and a jaw ring of the chuck of FIG. 2 in accordance with an example embodiment;

FIG. 6 illustrates a perspective view of a push plate of the chuck of FIG. 2 in accordance with an example embodiment;

FIG. 7 illustrates a perspective view of a nut of the chuck of FIG. 2 in accordance with an example embodiment;

FIG. 8 illustrates a perspective view of assembled components of the chuck of FIG. 2 including a body, a push plate, and a nut in accordance with an example embodiment;

FIG. 9 illustrates a cross-section side view of a sleeve and a nut of the chuck of FIG. 2 in accordance with an example embodiment;

FIG. 10 illustrates a perspective view of components of a clamping assembly including a nut of the chuck of FIG. 2 in accordance with an example embodiment;

FIG. 11 illustrates a cross-section front view of the chuck of FIG. 2 with lock spring pawls in an unlocked position in accordance with an example embodiment;

FIG. 12 illustrates a portion of a cross-section front view of the chuck of FIG. 2 with lock spring pawls in a locked position in accordance with an example embodiment;

FIG. 13 illustrates a side cross-section view of another chuck with a nut disengaged from the jaws in accordance with an example embodiment;

FIG. 14 illustrates a side cross-section view of the chuck of FIG. 13 with a nut engaged with the jaws in accordance with an example embodiment;

FIG. 15 illustrates a perspective view of some assembled components of the chuck of FIG. 13 including jaws, a push plate, and a body in accordance with an example embodiment;

FIG. 16 illustrates a perspective view of a jaw and a push plate of the chuck of FIG. 13 in accordance with an example embodiment;

FIG. 17 illustrates components of a clamping assembly of the chuck of FIG. 13 accordance with an example embodiment;

FIG. 18 illustrates a side cross-section view of another chuck with a nut disengaged for the jaws in accordance with an example embodiment;

FIG. 19 illustrates a side view of the chuck of FIG. 18 with the sleeve and sub-insert removed thereby revealing a rear portion of a nose and a guide ring of the chuck in accordance with an example embodiment;

FIG. 20 illustrates a nose in engagement with a guide ring at a nose ramp bottom in accordance with an example embodiment;

FIG. 21 illustrates a nose in engagement with a guide ring engages with a nose ramp in accordance with an example embodiment; and FIG. 22 illustrates a side cross-section view of another chuck in accordance with an example embodiment.

DETAILED DESCRIPTION OF SOME EXAMPLE EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

For many conventional chucks, turning the sleeve of the chuck turns a nut internal to the chuck and through screw action of a helical thread between the nut and the jaws of the chuck, the jaws translate to extend into a closed position to clamp onto a working bit or retract into an open position that permits a working bit to be removed or installed. In many instances, as mentioned above, many turns of the sleeve may be required to adjust the jaw opening (i.e., the opening between the jaws that the working bit may be received within) for different sized working bits. The time required to change bits may result in inefficiencies and loss of time when changing and working bit, particularly in high-throughput factory environments.

As such, it would be beneficial to design a chuck that can automatically adjust to the size of the working bit to speed the process of removing and replacing working bits. A technical problem with automatic adjustment of jaw opening is to provide for both automatic adjustability to fit the working bit, but also permit the jaws to be clamped with sufficient force onto the working bit to ensure that the working bit is secured within the jaws for operation. According some example embodiments, a technical solution to this problem may include the use of a jaw spring in the chuck that urges a push plate connected to the jaws forward to force the jaws into a closed position through spring action, but still allow for the jaws to be opened against the force of the jaw spring when inserting a working bit. Once inserted, according to some example embodiments, a clamping assembly may be operated by, for example, executing a relatively small turn of the sleeve to clamp the jaws onto the working bit with sufficient force to secure the working bit in position in the jaws. The various example embodiments described herein, operate to address this and other technical problems by employing a chuck design that supports automatic jaw adjustment and clamping onto a working bit.

In this regard, FIG. 1 illustrates and example chuck 10 according to some example embodiments. The chuck 10 is shown as being physically coupled to a portion of a power driver 20, which may be, for example, a pneumatic or electric powered tool (e.g., a drill) configured to rotate a drive spindle that is operably coupled to the chuck 10 in an opening on a rear side of the chuck 10. The chuck 10 may define a center axis 50, about which the chuck 10 may rotate when in operation, due to rotation of the drive spindle of the power driver 20. For orientation purposes, the chuck 10 may have a forward end 60 and a rearward end 70. As seen in FIG. 1, the chuck 10 may comprise, among other components, jaws 11, a nose 12, and a sleeve 13. As further described herein, the jaws 11 may be configured to move or translate in a closing or opening direction to change the size of the jaw opening between the forward ends of the jaws 11. According to some example embodiments, rotation of the sleeve 13 in the direction 14 may cause the jaws 11 to translate and clamp on to a working bit. The power driver housing 21 may be a component of the power driver 20.

FIGS. 2 through 12 illustrate an example chuck 100 and components thereof in various views that can be referenced together to facilitate understanding the various example embodiments. In this regard, FIG. 2 provides a cross-section side view of the chuck 100, while FIGS. 3 through 12 show various views of the chuck 100 or components thereof. Similar to the above, the chuck 100 may define a center axis 50. For orientation purposes, the chuck 100 may have a forward end 60 and a rearward end 70.

The cross-section side view of FIG. 2 shows the chuck 100, which may be affixed to a power driver such as the power driver 20. The chuck 100 may include various components that operate together to permit the chuck 100 to automatically close the jaws and facilitate clamping onto a working bit (not shown) to, for example, permit the working bit to turn a fastener, drill a hole, or the like in response to turning of a drive spindle of a power driver to which the chuck 100 is affixed. Among other components, the chuck 100 may include jaws 101, a sleeve 110, a nut 115, a jaw spring 120, a body 130, and a push plate 150. The body 130 may be a component that is affixed to the drive spindle and transfers rotation of the drive spindle to the jaws 101 to drive the working bit. The jaws 101 may be operably coupled to the body 130 via jaw passageways 131 in the body 130 as shown in exploded view of select components in FIG. 3, and the jaws 101 may be disposed at a forward end of the chuck 100. Because the jaws 101 are rotationally constrained in the jaw passageways 131, the jaws rotate with the body 130. However, the jaws 101 may be configured to move or translate relative to the body 130 within the jaw passageways 131 in response to forces applied on the jaws 101 via, for example, the push plate 150 to change the diameter of the jaw opening. According to some example embodiments, the chuck 100 may include three jaws 101 and the body 130 may include three associated jaw passageways 131. The jaw passageways 131 may permit the jaws 101 to move rearward into the body 130 (i.e., in a jaw opening direction to increase the diameter of the jaw opening) and move forward out of the body 130 (i.e., in a jaw closing direction to reduce the diameter of the jaw opening). In this regard, as the jaws 101 move forward within the passageways 131 in the jaw closing direction, the jaws 101 may move along a respective angle relative to the center axis 50 such that the jaws 101 decrease the diameter of the jaw opening and meet at a point on the center axis 50 forward of the body 130. Similarly, as the jaws 101 move rearward within the passageways 131 in the jaw opening direction, the jaws 101 may move along the respective angles relative to the center axis 50 such that the jaws 101 move away from that point on the center axis 50 forward of the body 130 and increase the diameter of the jaw opening. Via this jaw translational, angular movement, adjustability is provided such that the jaws 101 may engage working bits having different sized shafts.

The jaws 101 of the chuck 100 may be operably coupled together to facilitate synchronized movement for opening and closing the jaw opening. In this regard, jaws 101 may be coupled to each other through push plate 150 via jaw ring 152. As best seen in FIG. 5, each jaw 101 may include a jaw slot 102 at rear end of the jaw 101. The jaw slot 102 in each jaw 101 may be configured to receive the jaw ring 152. The jaw slots 102 may be positioned such that the slots are open in an direction away from the center axis 50. Because the jaws 101 are operable coupled together via the jaw ring 152, as the jaws 101 translate forward or rearward within the angled passageways 131 of the body 130, the jaws 101 may pivot about the point of the engagement of the jaw slot 102 and the jaw ring 152. The pivoting movement of the jaws 101 may cause the jaw opening between the jaws 101 to open or close in an corresponding fashion.

The jaws 101 may be additionally be operably coupled via engagement with the push plate 150. In this regard, the push plate 150 may include push plate slots 154 (as best seen in FIG. 6) through which a rear portion 103 of the jaws 101 may pass. The rear end positions 103 of the jaws 101 may be flattened (i.e., have one or more flat surfaces) such that the rear end may slidably fit into the push plate slots 154. The push plate slots 154 may be longer in length than the length of the flattened rear end portions 103 of the jaws 101. The jaws 101 may be configured to pivotally move within the push plate slots 154 due to engagement with the passageways 131 in the body 130 as the jaws 101 move forward or rearward. Additionally, the jaw ring 152 may rest on a rear surface of the push plate 150 (as shown in FIG. 4) and may therefore also operate to prevent the jaws 101 from sliding out of the push plate slots 154.

As such, the push plate 150 may be, for example, a generally circular component that may operate to couple the jaws 101 together and may provide a common component that, when translated axially relative to the center axis 50, causes the plurality of jaws 101 to translate within the passageways 131 in the body 130. Accordingly, since the jaws 101 are disposed within the passageways 131 of the body 103, the jaws 101 rotate with the body 130 but may translate relative to the body 130 with push plate 150. As such, due to the operable coupling with the jaws 101, the push plate 150 may also rotate with the jaws 101 and the body 130, but the push plate 150 may also translate axially relative the body 130.

The body 130, as best seen in isolation in FIG. 3, may be a substantially cylindrical component that includes the passageways 131 near the forward end of the body 130 and groups of body teeth 132 near the rear end of the body 130. The groups of body teeth 132 may be disposed on the body 130 such that the teeth are disposed on the exterior of the body 130 and oriented away from the center axis 50. The groups of body teeth 132 may be helically threaded and may have body teeth channels 133 disposed between the groups of body teeth 132. The body teeth channels 133 may smooth regions that have an absence of body teeth 132. In this regard, the groups of body teeth 132 may be considered a partial helical thread. The groups of body teeth 132 and the body teeth channels 133 may be equally spaces apart or may be bias spaced. According to some example embodiments, the groups of body teeth 132 may include some chamfer to permit engagement with teeth on the nut 115. Both the groups of body teeth 132 and the body teeth channels 133 may extend parallel to the center axis 50.

The nut 115 (which may also be referred to as a drive plate in chuck 100) may be a generally circular component that operably couples to body 130 and to the push plate 150. In this regard, the nut 115 may comprise a central opening through which the rear portion of the body 130 may be received. On an inner surface of the central opening, the nut 115 may include groupings of nut teeth 116, which may be helically threaded and oriented towards the center axis 50. The groups of nut teeth 116 may have nut teeth channels 118 disposed between the groups of nut teeth 116. The nut teeth channels 118 may smooth regions that have an absence of nut teeth 116. Both the groups of nut teeth 116 and the nut teeth channels 118 may extend parallel to the center axis 50. The width of the teeth within the groups of nut teeth 116 may be the same or smaller than the width of the body teeth channels 133. Further, the width of the teeth within the groups of body teeth 132 may be the same or smaller than the width of the nut teeth channels 118.

Although other components may be disposed between the nut 115 and the push plate 150 (e.g., locking member 140, ratchet ring 160, and bearing 170), the nut 115 and the push plate 150 may be operably coupled such that the nut 115 and the push plate 150 may axially translate forward and rearward together. In this regard, the jaw spring 120 may be configured to apply forward directed force on the nut 115 that urges the nut 115 in the forward direction. The jaw spring 120 may be a coil spring, (e.g., a conical coil spring with the narrower end at the rear) that is under compression within the chuck 100. The jaw spring 120 may be disposed in a rear cavity of the chuck 100 between the nut 115 and a dust cover 105. The dust cover 105 may be locked in place by a dust cover lock ring 106, which may be coupled into a groove in the body 130. In this regard, because the jaw spring 120 is under compression between the nut 115 and the dust cover 105 (which is locked in place), the jaw spring 120 may apply a forward directed force on the nut 115 to urge the nut 115 forward.

In this regard, when the groups of nut teeth 116 are rotationally aligned with the body teeth channels 133 and the groups of body teeth 132 are rotationally aligned with the nut teeth channels 118 (which may be referred to as being in the aligned position) the nut 115 may be free to translate axially relative to the body 130. As such, when the nut 115 is in the aligned position with the body 103, the nut 115 may be forced in the forward direction by the jaw spring 120 and the nut 115 may translate forward in response to the applied force. Accordingly, since the nut 115 translates axially forward, the push plate 150 may also translate axially forward due to the operable coupling between the nut 115 and the push plate 150. Since the push plate 150 translates axially forward, the jaws 101 may also be translated forward in the passageways 131 to force the jaws 101 into a closed position on, for example, a working bit. As such, this aligned position permits the chuck 100 to operate with an auto-adjustment feature for the jaws 101, because the jaws 101, according to some example embodiments, will be urged into the closed position automatically without requiring repeated turning of the sleeve 110. Further, if a working bit is not already installed in the jaw opening, the jaws 101 may be forced open by simply pushing the jaws 101 rearward (e.g., pushing the working bit into a closed jaw opening), against the urging of the jaw spring 120, which would cause the jaws 101 to slide rearward and expand the jaw opening to receive the working bit.

The forward directed force provided by the jaw spring 120 may not provide enough force to sufficiently clamp the jaws 101 onto the working bit to support working operation of the chuck 100 with a working bit installed. As such, a clamping assembly may be employed within the chuck 100 that is configured to facilitate further tightening and clamping of the jaws 101 onto the working bit so that the jaws 101 are sufficiently secured to the working bit for working operation. In this regard, after the nut 115 and the body 130 are in the aligned position and the working bit is installed in the jaws 101, the nut 115 may be rotated in a tightening direction such that at least some of the teeth within the groups of nut teeth 116 enter into helical threaded coupling with at least some of the teeth within the groups of body teeth 132. The helical threaded coupling between the groups of nut teeth 116 and the groups of body teeth 132 may operate to perform multiple functions. In this regard, the helical threaded coupling may prevent further sliding translation of the nut 115 relative to the body teeth channels 133. Also, the helical threaded coupling may allow the jaws 101 to be further tightened onto the working bit with sufficient force to hold the working bit in position while in working operation.

However, the clamping assembly may include addition components configured to secure the nut 115 in the tightened position and clamp the jaws 101 onto the working bit. In this regard, the clamping assembly may further include a locking member 140 and a ratchet member 160. With reference to FIG. 10, the locking member 140 may be formed as a ring that couples to or is integrated into, the nut 115. In this regard, the locking member 140 may be operably coupled to the nut 115 and may therefore translate axially with the nut 115 and rotate with the nut 115. According to some example embodiments, the locking member 140 may include recesses that receive the posts 117 of the nut 115 to operable couple the nut 115 to the locking member 140. The locking member 140 may include a plurality (e.g., three) spring arms 141 with lock spring pawls 142 disposed on the ends of the spring arms 141. The spring arms 141 and lock spring pawls 142 may be formed of, for example, metal (e.g., steel). The lock spring pawls 142 may be formed in a hook shape having a tip that is directed inward towards the center axis 50. The lock spring pawls 142 may also have a protruding portion that extends outward and away from the center axis 50. The spring arm 141 may be configured to flex to permit movement of the lock spring pawls 142 towards the center axis 50 and away from the center axis 50.

The ratchet member 160 may be ring-shaped with ratchet teeth 161 disposed on an outer edge of the ratchet member 160 and extending outwards and away from the center axis 50. The ratchet teeth 161 may be ramped to facilitate ratcheting engagement with the lock spring pawls 142, when the lock spring pawls 142 are moved into engagement with the ratchet teeth 161. The ratchet member 160 may be operably coupled to the push plate 150. In this regard, the ratchet member 160 may translate axially with the push plate 150 (which translates axially with the nut 115) and the ratchet member 160 may be rotationally fixed to the push plate 150 such that the ratchet member 160 does not rotate relative to the push plate 150, but may rotate relative to the nut 115. To operably couple to the push plate 150, the ratchet member 160 may include ratchet member recesses 162 that are configured to engage push plate tabs 153 thereby preventing relative rotation between the ratchet member 160 and the push plate 150.

Referring again to FIG. 2, a bearing 170 may also be included in the chuck 100. In this regard, the bearing 170 may be comprise of a ring with a plurality of holes for receiving respective bearing balls. The bearing 170 may be disposed between the lock ring 140 and the ratchet member 160. Since the ratchet member 160 is rotationally fixed with the push plate 150 and the body 130, the bearing 170 may facilitate reduced friction rotation of the lock ring 140 and the nut 115 relative to the ratchet member 160 when the nut 115 is rotationally coupled to the sleeve 110.

Additionally, to facilitate clamping of the jaws 101 onto a working bit, the sleeve 110, which may be rotated to perform the clamping function, may include a plurality of grooves. Referring now to FIG. 9, a side cross-section of the sleeve 110 with the nut 115 is shown. The nut 115 operably couples to the sleeve 110 via engagement of the posts 117 in respective post grooves 111 of the sleeve 110. In this regard, according to some example embodiments, the sleeve 110 may include three post grooves, i.e., one post groove 111 for each post 117 of the nut 115. The post grooves 111 may be disposed on an interior surface of the sleeve 110 and may extend in parallel with the center axis 50. In this regard, the post grooves 111 may operate to permit the nut 115 to translate axially relative to the sleeve 110, while remaining in operable coupling with the sleeve 110. Further, the post grooves 111 may be wider than a width of the posts 117 to permit the posts 117 to move rotationally within the post grooves 111 in a limited manner. In this regard, the posts 117, and thus the nut 115, may also rotate relative to sleeve 110 between the edges of the post grooves 111.

The sleeve 110 may also include a locking groove 112 and an unlocking groove 113. The locking groove 112 and the unlocking groove 113 may be configured to operably couple with a respective lock spring pawl 142 that may move between a locking groove 112 and an unlocking groove 113 in response to rotation of the sleeve 110. The locking member 140 may operably couple to the sleeve 110 via engagement of the lock spring pawls 142 with the locking grooves 112 and the unlocking grooves 113. In this regard, according to some example embodiments, the sleeve 110 may include three locking grooves 112 and three unlocking grooves 113, i.e., one locking groove 112 and one unlocking groove 113 for each lock spring pawl 142 of the locking member 140. The locking grooves 112 and the unlocking grooves 113 may be disposed on an interior surface of the sleeve 110 and may extend in parallel with the center axis 50. In this regard, the locking grooves 112 and the unlocking grooves 113 may operate to permit the lock spring pawls 142 to translate axially in the locking grooves 112 or the unlocking grooves 113 relative to the sleeve 110, while remaining in operable coupling with the sleeve 110. Further, the locking groove 112 may be shallower than the unlocking groove 113. When the lock spring pawls 142 are in the locking grooves 112, the lock spring pawls 142 may be deflected (deformed) inwards such that the lock spring pawls 142 engage with the ratchet teeth 161 of the ratchet member 160. Additionally, when the lock spring pawls 142 are in the unlocking grooves 112, the lock spring pawls 142 may be moved relatively outward (due to the unlocking grooves 113 being deeper) and out of engagement with the ratchet teeth 161 of the ratchet member 160.

With reference now to FIGS. 11 and 12, the operation of the clamping assembly to tighten and clamp the jaws 101 onto a working bit is described. FIGS. 11 and 12 show a cross-section forward view and a partial cross-section forward view of the chuck 100, respectively. In this regard, FIG. 11 depicts the chuck 100 in the unlocked position. In this regard, lock spring pawls 142 are shown as being disposed within respective unlocking grooves 113. As such, the lock spring pawls 142 are permitted to flex outwards and away from the center axis 50 such that the lock spring pawls 142 are not engaged with the ratchet teeth 161. Although not shown in FIG. 11, when the lock spring pawls 142 are disposed in the unlocking grooves 113, (i) the nut 115 may be in the aligned position with the body 103, (ii) the nut 115 may be forced in the forward direction by the jaw spring 120 to automatically close the jaw opening onto a working bit, (iii) the posts 117 may axially translate forward within the post grooves 111 against one side (e.g., the left side) of the post grooves 111, and (iv) the lock spring pawls 142 may axially translate forward within the unlocking grooves 113.

Note that in this unlocked position, the posts 117 of the nut 115 may be positioned against, for example, the left side of the post grooves 111. Also, with reference to FIG. 8, the posts 117 may be adjacent stops 151 of the push plate 150. In this regard, since the push plate 150 and the stops 151 are rotationally fixed in position with the body 130, the stops 151 may operate to prevent the nut 115 from being turned in a counter-clockwise direction (i.e., the loosening direction), when viewed at the forward end of the chuck 100, which would cause the nut 115 to move axially rearward due to the helical threaded coupling between the nut 115 and the body 130. As such, the nut 115 may be, according to some example embodiments, only permitted to rotate (e.g., clockwise) to cause the nut 115 to translate axially forward to act upon the push plate 150 and cause the jaws 101 to tighten onto, for example, a working bit.

Referring again to FIGS. 11 and 12, to transition the clamping assembly and the chuck 100 to tighten and clamp the jaws 101 onto the working bit, the sleeve 110 may, according to some example embodiments, be rotated in the tightening direction (e.g., the clockwise direction) relative to the ratchet member 160 (and the push plate 150) as indicated by arrow 80 in FIG. 12. In this regard, the posts 117 may be positioned on the left side of the post grooves 111 and the sleeve 110 may be rotated (e.g., by hand) in, for example, the clockwise direction as provided by arrow 80. As the sleeve 110 rotates, the posts 117 may remain stationary as rotation of the sleeve 110 moves the posts 117 to the right side of the post groove 111 (as shown in FIG. 12), where the nut 115 is rotationally engaged with the sleeve 110. As the sleeve 110 rotates relative to the post 117, the sleeve 110 also rotates relative to the lock spring pawls 142 thereby moving the lock spring pawls 142 out of engagement with the unlocking groove 113 of the sleeve 110 and into engagement with the locking groove 112. Since locking groove 112 is shallower than unlocking groove 113, the lock spring pawls 142 are urged inward towards the center axis 50 to engage with respective ones of the ratchet teeth 161. As shown in FIG. 12, the lock spring pawls 142 may engage a non-ramped edge (or catch edge) of a ratchet tooth 161. As such, when initially in the locked position, the nut 115 has not yet rotated because the posts 117 have remained stationary in the post grooves 111. Because the sleeve 110 has rotated relative to the posts 117 and the nut 115, the lock spring pawls 142 have now moved into a ratcheting position in engagement with the ratchet teeth 161. In this regard, further rotation of the sleeve 110 may operate to rotate the nut 115 through rotational coupling of the sleeve 110 with the posts 117 of the nut 115 in the post groove 111, the posts 117 abut the right side edge of the post groove 111. The nut 115 therefore translates axially forward in response to this further rotation of the sleeve 110 due to the helical threaded coupling with the body 130 to force the push plate 150 forward and tighten the jaws 101 on the working bit. Since the lock spring pawls 142 are engaged with the ratchet teeth 161, as the sleeve 110 turns further and the nut 115 translates forward, the lock spring pawls 142 ratchet along adjacent ratchet teeth 161 due to the ramped shape of the ratchet teeth to lock the nut 115 into an increasingly tightened position and clamp the jaws 101 onto the working bit.

To unclamp the jaws 101 from the working bit, the sleeve 110 may be simply turned in the opposite direction (e.g., counter-clockwise or loosening direction) to move the lock spring pawls 142 back into the unlocked groove 113 and out of engagement with the ratchet teeth 161. The sleeve 110 may continue to be turned until the posts 117 are stopped from further rotation by stops 151 and the nut 115 is returned to the aligned position with the body 130. As such, since the working bit is no longer clamped into the jaws 101, the working bit may be removed from the jaws 101.

Now with reference to FIGS. 13 to 16, another example embodiment of a chuck 200 is described that also provides functionality for automatically adjusting of the jaw opening to receive a working bit. The chuck 200 may define a center axis 50. For orientation purposes, the chuck 200 may have a forward end 60 and a rearward end 70.

In general, the chuck 200 operates similar to the chuck 100, with the exception of the clamping assembly and the operation of the nut relative to the jaws that leads to tightening and clamping of the jaws. The cross-section side view of FIGS. 13 and 14 show the chuck 200, which may be affixed to a power driver such as the power driver 20. As further described below, FIG. 13 shows the sleeve 210 in a forward position with the nut 215 disengaged from the jaws 201 and FIG. 14 shows the sleeve 210 in a rearward position with the nut 215 engaged with the jaws 201.

The chuck 200 may include various components that operate together to permit the chuck 200 to automatically adjust the jaw opening to the size of a working bit (not shown) and then tighten and clamp onto the working bit. The chuck 200 may be operably coupled to a drive spindle of a power driver to, for example, turn a fastener, drill a hole, or the like. Among other components, the chuck 200 may include jaws 201, a sleeve 210, a nut 215, a body 230, a push plate 250, a jaw spring 220, and a nut spring 222. The body 230 may be a component that is affixed to the drive spindle and transfers rotation of the drive spindle to the jaws 201 to drive the working bit. The body 230, as best seen in FIG. 15, may be a substantially cylindrical component that includes the passageways 231 near the forward end of the body 230. The body 230 may also include a nose 223 that is operably coupled to the body 230 near the forward end 60, such that the nose 223 cannot move relative to the body 230. The jaws 201 may be operably coupled to the body 230 via jaw passageways 231 in the body 230 (FIG. 15). Because the jaws 201 are rotationally constrained in the jaw passageways 231, the jaws rotate with the body 230. However, the jaws 201 may be configured to move or translate relative to the body 230 within the jaw passageways 231 in response to forces applied on the jaws 201 via the jaw spring 220 and the nut 215 to change the diameter of the jaw opening. According to some example embodiments, the chuck 200 may include three jaws 201 and the body 230 may include three associated jaw passageways 231. The jaw passageways 231 may operate to permit the jaws 201 to move rearward into the body 230 (i.e., in a jaw opening direction to increase the diameter of the jaw opening) and forward out of the body 230 (i.e., in a jaw closing direction to reduce the diameter of the jaw opening). In this regard, as the jaws 201 move forward within the passageways 231 in the jaw closing direction, the jaws 201 may move along a respective angle relative to the center axis 50 such that the jaws 201 decrease the diameter of the jaw opening and meet at a point on the center axis 50 forward of the body 230. Similarly, as the jaws 201 move rearward within the passageways 231 in the jaw opening direction, the jaws 201 may move along the respective angles relative to the center axis 50 such that the jaws 201 move away from that point on the center axis 50 forward of the body 230 and increase the diameter of the jaw opening. Via this jaw translational, angular movement, adjustability is provided such that the jaws 201 may engage working bits having different sized shafts. Accordingly, the jaws 201 may move relative to the body 230 in the jaw passageway 231, but the jaws 201 may be operably coupled to the body 230 such that the jaws 201 rotate with the body 230.

In the chuck 200, the jaws 201 may be operably coupled together to facilitate synchronized movement for opening and closing the jaw opening. In this regard, jaws 201 may be coupled to each other via push plate 250. As best seen in FIGS. 15 and 16, each jaw 201 may include a jaw slot 202 at a rear end 203 of the jaw 201 that is configured to slidably couple with the push plate slot 251 in the push plate 250. The push plate slots 251 may be positioned on the push plate 250 such that the push plate slots 251 are open in an direction away from the center axis 50. Further, as the jaws 201 translate within the angled passageways 231 of the body 230, the jaws 201 and, more particularly, the jaw slots 202 may slide radially within the push plate slots 251 towards the center axis 50 when translating forward to close the jaw opening and may slide radially within the push plate slots 251 away from the center axis 50 when translating rearward to open the jaw opening. As such, because the jaws 201 are each coupled to the push plate 250, the jaws 201 may move in a synchronized fashion.

The push plate 250 may be, for example, a generally circular component with an interior opening that receives a portion of the body 230 and may operate to couple the jaws 201 together. The push plate 250 may provide a common component that, when translated axially relative to the center axis 50, causes the plurality of jaws 201 to translate within the passageways 231 in the body 230. As such, due to the operable coupling with the jaws 201, the push plate 250 may also rotate with the jaws 201 and the body 230, but may translate axially relative the body 230.

The push plate 150 may be operably coupled to the jaw spring 220, which may be configured to apply a forward directed force on the push plate 250 that urges the push plate 250 and the jaws 201 in the forward direction. The jaw spring 220 may be a coil spring, (e.g., a conical coil spring with the narrower end physically coupled to the push plate 250) that is under compression within the chuck 200. The jaw spring 220 may be disposed in a rear cavity of the chuck 200 between the push plate 250 and a dust cover 205 that is affixed in place to the body 230. In this regard, because the jaw spring 220 is under compression between the push plate 250 and the dust cover 205 (which is affixed in place at least preventing axial translational movement), the jaw spring 220 may apply a forward directed force on the push plate 250 to urge the push plate 250 and the jaws 201 forward. Since the push plate 250 is translated axially forward, the jaws 201 may also be translated forward in the passageways 231 to force the jaws 201 into a closed position on, for example, a working bit. As such, the forward directed force applied by the jaw spring 220 on the push plate 250 provides the chuck 200 with auto adjustment feature for the jaws 201, because the jaws 201, according to some example embodiments, will be urged into the closed position automatically without requiring repeated turning of the sleeve 210. Further, if a working bit is not already installed in the jaw opening, the jaws 201 may be forced open by simply pushing the jaws 201 rearward (e.g., pushing the working bit into a closed jaw opening), against the urging of the jaw spring 220, which would cause the jaws 201 to slide rearward and expand the jaw opening to receive the working bit.

As shown in FIG. 13, the jaws 201 are permitted to translate forward because the nut 215 is not engaged with the jaws 201. In this regard, the nut 215 may include nut teeth 216 that are configured to engage in helically threaded coupling with jaw teeth 202. However, to permit or inhibit the axial translation of the push plate 250 and translational movement of the jaws 201, the nut 215 may be configured to translate axially (relative to the center axis 50) to engage or disengage the nut teeth 216 with or from the jaw teeth 202. In this regard, the nut 215 may be operably coupled to the sleeve 210 such that the nut 215 may translate axially into the engaged position when the sleeve 210 is moved rearward (FIG. 14) and translate axially into the disengaged position when the sleeve 210 is moved forward (FIG. 13). As shown in FIG. 14, axial translation of the sleeve 210 in a rearward direction causes the sleeve 210 to slide into the dust cover 205 in a nested fashion.

Additionally, in the chuck 200, a nut spring 222 may be disposed under compression between the push plate 250 and a snap ring 221. In this regard, the snap ring 221 may be affixed to an interior surface of the sleeve 210 and may be prevented from translating axially relative to the sleeve 210. As such, the nut spring 222 may apply a second forward directed force on the sleeve 210 relative to the push plate 250 to urge the sleeve 210 and the nut 215 forward into the disengaged position. As such, to transition the sleeve 210 and the nut 215 into the engaged position with the jaws 201, a user may pull the sleeve 210 rearward as indicated by arrow 290 of FIG. 14, against the force of the nut spring 222.

To further tighten and clamp the jaws 201 onto the working bit, a clamping assembly may be employed that facilitates tightening and clamping. In this regard, with reference to FIG. 17, the clamping assembly may include a sub-insert 280, the nut 215, a lock ring 240, bearing balls 270, and a ratcheting member 260. The sub-insert 280 may be affixed to or integrated with the sleeve 210. The sub-insert 280 may include internal recesses including unlocking recess 281 and locking recess 282. The lock ring 240 may be operably coupled to the nut 215 such that the lock ring 240 translates axially with the nut 215 and rotates about the center axis 50 with the nut 215. The nut 215 may be operably coupled with a friction ring 271 that may comprised of rubber or a high friction substance and be co-molded on the nut 215. The lock ring 240 may include one or more spring arms 241 that are movable outwardly when a force is applied to an engaging nub 243 disposed at the end of the spring arm 241. Further, at least one of the spring arms 241 may also include a locking pawl 242 that, according to some example embodiments, extends outward and away from the center axis 50 to facilitate a ratcheting function. According to some example embodiments, the lock ring 240, the bearing balls 270, and the ratchet member 260 may be separately assembled as a sub-assembly unitary part. The ball bearings 270 may operate to reduce frictional forces that occur in response to the rotation of the nut 215. The ratchet member 260 may be formed as a ring and may be rotationally fixed to the body 230, such that the nut 215 and the lock ring 240 may rotate relative to the ratchet member 260. The ratchet member 260 may include ratchet teeth 261 that are disposed on an internal surface of the ratchet member 260. The ratchet teeth 261 may extend inwards toward the center axis 50 and the ratchet teeth 260 may include a ramped surface to facilitate ratcheting functionality.

With respect to functionality, when the sleeve 210 and the nut 215 in the engaged position as provided in FIG. 14, the sleeve 210 may be rotated in a tightening direction and the helical threaded coupling between the nut teeth 216 and the jaw teeth 202 can cause the jaws 201 to move forward and tighten onto a working bit. Additionally, when rotation of the sleeve 210 reaches a threshold torque due to the increased tightening and, according to some example embodiments due to the interaction between the friction ring 271 and the sub-insert 280, the engaging nubs 243 of the lock ring 240 can rotate out of the unlocking recess 281 and into a deeper locking recess 282. Accordingly, because the locking recess 282 is deeper than the unlocking recess 281, the locking pawl 242 may be released outwards and into engagement with a ratchet teeth 261 of the ratchet member 260. In this regard, at least one spring arm 241 may be released outwards as engaging nubs 243 seat in recess 282, thereby causing locking pawl 242 to engage with ratchet teeth 261 of the ratchet member 260. Thus, as further rotation of the sleeve 210 and the nut 215 continues in the tightening direction thereby urging the jaws 201 forward, the locking pawl 241 can rotate along the ratchet teeth 261 engaging each adjacent tooth 261 thereby preventing rotation of the nut 215 in an opposite, loosening direction that might be caused by, for example, vibration of the chuck 200 or the like. Additionally, because the torque on the nut 215 is maintained by the ratchet function, the jaws 201 can clamp onto the working bit securely and the clamping force on the working bit can be maintained.

To release the clamping on the working bit, the sleeve 210 may be rotated in an opposite, loosening direction. By doing so, the sub-insert 280 may rotate while the engaging nubs 243 and the locking pawl 241 remain relatively stationary such that the engaging nubs 243 move into the shallower unlocked recess 281. As such, the spring arm 241 and the locking pawl 242 may be deflected or deformed inwards and the locking pawl 241 may move out of engagement with the ratchet teeth 261, thereby permitting the nut 215 to rotate in the loosening direction to release the clamping on the working bit.

Now with reference to FIGS. 18 through 21, another example embodiment of a chuck 295 is described that also provides functionality for automatically adjusting the jaw opening to receive a working bit. In this regard, FIG. 18 shows a side cross-section view of the chuck 295 along the axis 50 and FIG. 19 shows an assembled view of the chuck 295 with the sleeve 210 and sub insert 280 removed thereby revealing a rear portion of a nose 224 and a guide ring 226. The chuck 295 generally operates in a similar manner as chuck 200 with like numbered components being structured and functioning in the same or a similar manner as those of chuck 200. In this regard, the jaw spring 220 is under compression between the push plate 250 and the dust cover 205 (which is affixed in place at least preventing axial translational movement), and thus the jaw spring 220 may apply a forward directed force on the push plate 250 to urge the push plate 250 and the jaws 201 forward into a closed position, for example, on a working bit, when the nut 215 is not engaged with the jaws 201.

Chuck 295, however, includes features that operate to translate the nut 215 axially rearward, against the second forward directed force generated by the nut spring 222, into engagement with the jaws 201, in response to rotation of the sleeve 210 in the tightening direction to facilitate clamping the jaws 201 onto a working bit. As such, according to some example embodiments, a user need not be required to pull the sleeve 210 rearward as provided in association with chuck 200, but rather, simply turn the sleeve 210 to complete the clamping operation.

In this regard, chuck 295 may include a modified nose 224. The nose 224 may be an open ring-shaped member that is affixed to the body 230 such that the nose 224 does not translate or rotate relative to the body 230. The nose 224 may include a rear facing portion that includes at least one rearward facing nose ramp 228. The nose ramp 228 may extend about a portion of a circumference of the rear facing portion of the nose 224 between a respective nose ramp peak 229 and a nose ramp bottom 225.

The chuck 295 may also include a guide ring 226. The guide ring 226 may be a ring-shaped member with one or more guide ring protrusions 227 that are configured to operably couple with the nose ramp 228 of the nose 224 and therefore extend in a forward direction. The guide ring 226 may be affixed to or integrated with an interior surface of the sleeve 210 or the sub-insert 280 and may be configured to both rotate and translate with the sleeve 210, possibly via fixed engagement with the sub-insert 280. The guide ring 226 may include an inner opening that is positioned around the body 230, and the guide ring 226 may be disposed between the nose 224 and the nut 215. In this regard, the guide ring 226 may operably couple with the nut 215 such that axial translation of the guide ring 226 causes axial translation of the nut 215. Accordingly, if the guide ring 226 translates axially rearward, then the nut 215 also translates axially rearward and into engagement with the jaws 201.

In this regard, as best shown in FIGS. 20 and 21, the guide ring 226 may rotate with the sleeve 210 and relative to the nose 224. When the sleeve 210 is rotated in the tightening direction, the guide ring protrusion 227 may ride along the nose ramp 228 from the nose ramp bottom 225 towards the nose ramp peak 229. FIG. 20 shows the guide ring protrusion 227 disposed at the nose ramp bottom 225. With reference to FIG. 21, the sleeve 210 has been rotated in the tightening direction and therefore the guide ring 226 has also rotated in the tightening direction 296. As the guide ring 226 rotates, the guide ring protrusion 227 rotates relative to the nose 224 and rides on the nose ramp 228 to cause a camming action that translates the guide ring 226 axially rearward in the direction of the arrow 297, as shown in FIG. 21, against the second forward directed force applied by the nut spring 222. Due to the operable coupling with the nut 215, the guide ring 226 also forces the nut 215 and the nut teeth 216 into engagement with jaw teeth 202 of the jaws 201. Due to this engagement between the nut teeth 216 and the jaw teeth 202, the nut 215 may be prevented from further axial translation in the rearward direction and further rotation of the sleeve 210 may operate to clamp the nut 215 onto the jaws 201 due to the helical threaded coupling between the nut teeth 216 and the jaw teeth 202. To loosen the jaws 201 and remove the clamping on the working bit, the sleeve 110 may be rotated in the loosening direction until the helically threaded engagement between the nut teeth 216 and the jaw teeth 202 is released such that the nut 215 may be free to translate axially forward and away from the jaws 201. The guide ring 226 may also rotate in the loosening direction with the sleeve 210 such that the guide ring protrusion 227 rotates along the nose ramp 228 to the nose ramp bottom 225 thereby permitting the nut 215 to translate forward and out of engagement with the jaws 201.

Now with reference to FIG. 22, another example embodiment of a chuck 300 is described that also provides functionality for automatically adjusting the jaw opening to receive a working bit. The chuck 300 generally operates in a similar manner as chuck 200 with like numbered components being structured and functioning in the same or a similar manner as those of chuck 200.

However, nut spring 322 of the chuck 300 is alternatively located forward of the nut 215. In this regard, the nut spring 322 may be disposed in a cavity between the nose 223 and a snap ring 321 that is affixed to the nut 315. The nut spring 322 may therefore be under compression in this location and may apply a rearward directed force onto the snap ring 321 and the nut 215. In this regard, due to the compressed nut spring 322 being disposed forward of the nut 215, the nut spring 322 provides a rearward directed force that urges the nut 215 rearward and into engagement with the jaws 201 (rather than out of engagement with the jaws as described with chuck 200). As such, unlike chuck 200, the rearward force provided by the nut spring 322 may maintain the nut teeth 216 in engagement with the jaw teeth 202. To permit the chuck 300 to auto-adjust, a user may translate the sleeve 210 forward in the direction of the arrow 390, against the force provided by the nut spring 322, to disengage the nut 215 from the jaws 201 to permit the jaws 201 to be translated forward by the operable coupling between the push plate 250 and the jaw spring 220. Once the jaws 201 have translated forward to engage the working bit, the sleeve 210 may be released by the user and nut 215 may translate axially rearward to re-engage with the jaws 201. Subsequently, the sleeve 210 may be turned in a tightening direction as described above and the jaws 201 may be clamped onto the working bit. Similar to chuck 200, to remove the working bit, the sleeve 210 may be turned in the loosening direction to release the clamping on the working bit.

In view of the forgoing, according to some example embodiments, an example chuck may be provided for use with a power driver having a rotatable drive spindle. The chuck may comprise a plurality of jaws disposed at a forward end of the chuck. The jaws may define a jaw opening between the jaws for receiving a working bit. Additionally or alternatively, the chuck may comprise a body. In this regard, the plurality of jaws may be disposed in respective passageways in the body and configured to rotate with the body about a center axis of the chuck. Additionally or alternatively, the chuck may further comprise a push plate operably coupled to each of the jaws. The jaws may be configured to translate forward in the respective passageways to close the jaw opening in response to the push plate translating axially forward. Additionally or alternatively, the chuck may further comprise a jaw spring configured to apply a forward directed force to urge the push plate forward, and/or a sleeve. Additionally or alternatively, the chuck may further comprise a nut having nut teeth configured to be engagable in a helically threaded coupling. The sleeve may be configured to cause the nut to rotate in a tightening direction in response to the sleeve being rotated in the tightening direction and the nut being rotationally engaged with the sleeve. The nut may be configured to cause the jaws to translate forward and clamp onto the working bit in response to the nut being rotated in the tightening direction.

According to some example embodiments, the nut teeth of the example chuck may be engaged in the helically threaded coupling with body teeth disposed on the body. Further, the nut may be operably coupled to the push plate such that rotation of the nut in the tightening direction causes the push plate to translate axially forward thereby causing the jaws to translate forward to clamp the jaws onto the working bit.

Additionally or alternatively, according to some example embodiments, the nut teeth may be configured to be engaged in the helically threaded coupling with body teeth disposed on the body in response to rotation of the nut in the tightening direction. In this regard, the nut may further comprise a nut teeth channel extending parallel to the center axis and disposed between groupings of the nut teeth that extend parallel to the center axis. The body may further comprise a body teeth channel extending parallel to the center axis and disposed between groupings of the body teeth that extend parallel to the center axis. Additionally or alternatively, according to some example embodiments, the nut may be operably coupled to the push plate. Further, the jaw spring may be configured to apply the forward directed force on the nut to cause the nut and the push plate to translate axially forward when the nut teeth channel is aligned with a grouping of the body teeth and the body teeth channel is aligned with a grouping of the nut teeth.

Additionally or alternatively, according to some example embodiments, the chuck may further comprise a ratchet member comprising ratchet teeth. The ratchet member may be rotationally coupled with the body such that the ratchet member rotates with the body. The lock spring pawl may be operably coupled to the nut such that the lock spring pawl translates axially with the nut and rotates with the nut. The sleeve may further comprise an unlock recess.

Additionally or alternatively, according to some example embodiments, the sleeve may be configured to, when the nut is rotationally engaged with the sleeve and the sleeve is rotated in the tightening direction, cause rotation of the nut and the lock spring pawl such that the lock spring pawl moves out of the unlock recess in the sleeve and deflects inward to engage at least one of the ratchet teeth to thereby lock the jaws onto the working bit.

Additionally or alternatively, according to some example embodiments, the nut may be configured to translate axially in response to axial translation of the sleeve between a disengaged position and an engaged position. Further, in the disengaged position, the nut teeth may be disengaged from the jaw teeth to permit the jaws to translate forward and close the jaw opening in response to the forward directed force applied by the jaw spring on the push plate. Additionally, in the engaged position, the nut teeth may be engaged with jaw teeth such that rotation of the nut in the tightening direction causes the jaws to translate forward and clamp onto the working bit. Additionally or alternatively, according to some example embodiments, the chuck may further comprise a nut spring configured to apply a second forward directed force on the nut to urge the nut into the disengaged position. Additionally or alternatively, according to some example embodiments, the chuck may further comprise a guide ring that is operably coupled to the nut and the sleeve, such that when the sleeve is rotated in the tightening direction, the guide ring rotates and, via camming action, causes axial translation of the nut into the engaged position. Additionally or alternatively, according to some example embodiments, the chuck may further comprise a nut spring configured to apply a rearward directed force on the nut to urge the nut into the engaged position.

Additionally or alternatively, according to some example embodiments, the sleeve may nest within a dust cover, and the sleeve may be configured to translate axially relative to the dust cover. Additionally or alternatively, according to some example embodiments, each jaw may operably couple to the push plate via a respective push plate slot. Additionally or alternatively, according to some example embodiments, each jaw may be configured to move within the respective push plate slot to change a size of the jaw opening.

According to some example embodiments, another example chuck for use with a power driver having a rotatable drive spindle is provided. The example chuck may comprise a plurality of jaws disposed at a forward end of the chuck. The jaws may define a jaw opening between the jaws for receiving a working bit. Additionally or alternatively, the chuck may further comprise a body comprising groupings of body teeth and a body teeth channel extending parallel to a center axis of the chuck and disposed between groupings of the body teeth. The plurality of jaws may be disposed in respective passageways in the body and configured to rotate with the body about the center axis. Additionally or alternatively, the chuck may comprise a nut comprising groupings of nut teeth and a nut teeth channel disposed between the groupings of nut teeth. The nut teeth channel may extend parallel to the center axis. Additionally or alternatively, the chuck may comprise a push plate operably coupled to the nut and to each of the jaws. The jaws may be configured to translate forward in the passageways to close the jaw opening in response to the push plate translating axially forward. Additionally or alternatively, the chuck may comprise a jaw spring configured to apply a forward directed force to urge the push plate forward. The groupings of nut teeth may be configured to be engaged in a helically threaded coupling with the groupings of body teeth in response to rotation of the nut in a tightening direction which causes the nut to translate axially forward with the push plate to cause the jaws to translate forward and clamp onto the working bit.

Additionally or alternatively, according to some example embodiments, the jaw spring may be configured to apply the forward directed force on the nut to cause the nut and the push plate to translate axially forward when the nut teeth channel is aligned with a grouping of the body teeth and the body teeth channel is aligned with a grouping of the nut teeth.

Additionally or alternatively, according to some example embodiments, the chuck may further comprise a sleeve with an unlock recess and a ratchet member comprising ratchet teeth. The ratchet member may be rotationally coupled with the body such that the ratchet member rotates with the body. The chuck may further comprise a lock spring pawl operably coupled to the nut such that the lock spring pawl translates axially with the nut and rotates with the nut. The sleeve may be configured to, when the nut is rotationally engaged with the sleeve and the sleeve is rotated in the tightening direction, cause rotation of the nut and the lock spring pawl such that the lock spring pawl moves out of the unlock recess in the sleeve and deflects inward to engage at least one of the ratchet teeth to lock the jaws onto the working bit.

According to some example embodiments, another example chuck for use with a power driver having a rotatable drive spindle is provided. The chuck may comprise a plurality of jaws disposed at a forward end of the chuck. The jaws may define a jaw opening between the jaws for receiving a working bit. Each jaw may comprise jaw teeth. Additionally or alternatively, the chuck may comprise a body. The plurality of jaws may be disposed in respective passageways in the body and configured to rotate with the body about a center axis of the chuck. Additionally or alternatively, the chuck may include a push plate operably coupled to each of the jaws. The jaws may be configured to translate forward in the respective passageways of the body to close the jaw opening in response to the push plate translating axially forward. Additionally or alternatively, the chuck may further comprise a jaw spring configured to apply a forward directed force to urge the push plate forward, and/or a nut having nut teeth. The nut may be configured to translate axially between a disengaged position and an engaged position. In the disengaged position, the nut teeth may be disengaged from the jaw teeth to permit the jaws to translate forward and close the jaw opening in response to the forward directed force applied by the jaw spring on the push plate. In the engaged position, the nut teeth may be engaged in a helically threaded coupling with jaw teeth such that rotation of the nut in the tightening direction causes the jaws to translate forward and clamp onto the working bit.

According to some example embodiments, the chuck may further comprise a nut spring configured to apply a second forward directed force on the nut to urge the nut into the disengaged position. Additionally or alternatively, according to some example embodiments, the chuck may further comprise a nut spring configured to apply a rearward directed force on the nut to urge the nut into the engaged position. Additionally or alternatively, according to some example embodiments, the chuck may further comprise a sleeve that is operably coupled to the nut. In this regard, the sleeve may nest within a dust cover and the sleeve may be configured to translate axially with the nut relative to the dust cover. Additionally or alternatively, according to some example embodiments, each jaw operably couples to the push plate via a respective push plate slot. Additionally or alternatively, according to some example embodiments, each jaw is configured to move within the respective push plate slot to change a size of the jaw opening.

Many modifications and other embodiments of the chuck set forth herein will come to mind to one skilled in the art to which these embodiments pertain having the benefit of the teachings presented in the foregoing descriptions and the associated drawings. Therefore, it is to be understood that the chucks are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A chuck for use with a power driver having a rotatable drive spindle, the chuck comprising:
    a plurality of jaws disposed at a forward end of the chuck, the jaws defining a jaw opening between the jaws for receiving a working bit;
    a body, wherein the plurality of jaws are disposed in respective passageways in the body and configured to rotate with the body about a center axis of the chuck;
    a push plate operably coupled to each of the jaws, wherein the jaws are configured to translate forward in the respective passageways to close the jaw opening in response to the push plate translating axially forward;
    a jaw spring configured to apply a forward directed force to urge the push plate forward;
    a sleeve; and
    a nut having nut teeth configured to be engagable in a helically threaded coupling, the nut being configured to translate axially when the helically threaded coupling is disengaged;
    wherein the sleeve is configured to cause the nut to rotate in a tightening direction in response to the sleeve being rotated in the tightening direction and the nut being rotationally engaged with the sleeve; and
    wherein the nut is configured to cause the jaws to translate forward and clamp onto the working bit in response to the nut being rotated in the tightening direction.

2. The chuck of claim 1, wherein the nut teeth are engaged in the helically threaded coupling with body teeth disposed on the body, and wherein, the nut is operably coupled to the push plate such that rotation of the nut in the tightening direction causes the push plate to translate axially forward thereby causing the jaws to translate forward to clamp the jaws onto the working bit.

3. The chuck of claim 1, wherein the nut teeth are configured to be engaged in the helically threaded coupling with body teeth disposed on the body in response to rotation of the nut in the tightening direction, wherein the nut further comprises a nut teeth channel extending parallel to the center axis and disposed between groupings of the nut teeth that extend parallel to the center axis, wherein the body further comprises a body teeth channel extending parallel to the center axis and disposed between groupings of the body teeth that extend parallel to the center axis.

4. The chuck of claim 3, wherein the nut is operably coupled to the push plate; and wherein the jaw spring is configured to apply the forward directed force on the nut to cause the nut and the push plate to translate axially forward when the nut teeth channel is aligned with a grouping of the body teeth and the body teeth channel is aligned with a grouping of the nut teeth.

5. The chuck of claim 1, further comprising:
    a ratchet member comprising ratchet teeth, the ratchet member being rotationally coupled with the body such that the ratchet member rotates with the body; and
    a lock spring pawl operably coupled to the nut such that the lock spring pawl translates axially with the nut and rotates with the nut;
    wherein the sleeve further comprises an unlock recess;
    wherein the sleeve is configured to, when the nut is rotationally engaged with the sleeve and the sleeve is rotated in the tightening direction, cause rotation of the nut and the lock spring pawl such that the lock spring pawl moves out of the unlock recess in the sleeve and deflects inward to engage at least one of the ratchet teeth to thereby lock the jaws onto the working bit.

6. The chuck of claim 1, wherein the nut is configured to translate axially in response to axial translation of the sleeve between a disengaged position and an engaged position; and wherein, in the disengaged position, the nut teeth are disengaged from the jaw teeth to permit the jaws to translate forward and close the jaw opening in response to the forward directed force applied by the jaw spring on the push plate, and wherein, in the engaged position, the nut teeth are engaged with jaw teeth such that rotation of the nut in the tightening direction causes the jaws to translate forward and clamp onto the working bit.

7. The chuck of claim 6, further comprising a nut spring configured to apply a second forward directed force on the nut to urge the nut into the disengaged position.

8. The chuck of claim 7, further comprising a guide ring that is operably coupled to the nut and the sleeve, such that when the sleeve is rotated in the tightening direction, the guide ring rotates and, via camming action, causes axial translation of the nut into the engaged position.

9. The chuck of claim 6, further comprising a nut spring configured to apply a rearward directed force on the nut to urge the nut into the engaged position.

10. The chuck of claim 1, wherein the nut moves axially with the sleeve.

11. The chuck of claim 1, wherein the nut has a rigid, continuous ring-shape.

12. A chuck for use with a power driver having a rotatable drive spindle, the chuck comprising:
    a plurality of jaws disposed at a forward end of the chuck, the jaws defining a jaw opening between the jaws for receiving a working bit;
    a body, wherein the plurality of jaws are disposed in respective passageways in the body and configured to rotate with the body about a center axis of the chuck;
    a push plate operably coupled to each of the jaws, wherein the jaws are configured to translate forward in the respective passageways to close the jaw opening in response to the push plate translating axially forward;
    a jaw spring configured to apply a forward directed force to urge the push plate forward;
    a sleeve; and
    a nut having nut teeth configured to be engageable in a helically threaded coupling;

wherein the sleeve is configured to cause the nut to rotate in a tightening direction in response to the sleeve being rotated in the tightening direction and the nut being rotationally engaged with the sleeve;

wherein the nut is configured to cause the jaws to translate forward and clamp onto the working bit in response to the nut being rotated in the tightening direction; and wherein the sleeve nests within a dust cover, and the sleeve is configured to translate axially relative to the dust cover.

13. The chuck of claim 1, wherein each jaw operably couples to the push plate via a respective push plate slot.

14. The chuck of claim 13, wherein each jaw is configured to move within the respective push plate slot to change a size of the jaw opening.

15. A chuck for use with a power driver having a rotatable drive spindle, the chuck comprising:
- a plurality of jaws disposed at a forward end of the chuck, the jaws defining a jaw opening between the jaws for receiving a working bit, each jaw comprising jaw teeth;
- a body, wherein the plurality of jaws are disposed in respective passageways in the body and configured to rotate with the body about a center axis of the chuck;
- a push plate operably coupled to each of the jaws, wherein the jaws are configured to translate forward in the respective passageways of the body to close the jaw opening in response to the push plate translating axially forward;
- a jaw spring configured to apply a forward directed force to urge the push plate forward; and
- a nut having nut teeth, the nut being configured to translate axially between a disengaged position where the nut is not engaged with the plurality of jaws and an engaged position where the nut is engaged with the plurality of jaws;

wherein, in the disengaged position, the nut teeth are disengaged from the jaw teeth to permit the jaws to translate forward and close the jaw opening in response to the forward directed force applied by the jaw spring on the push plate, and wherein, in the engaged position, the nut teeth are engaged in a helically threaded coupling with jaw teeth such that rotation of the nut in the tightening direction causes the jaws to translate forward and clamp onto the working bit.

16. The chuck of claim 15, further comprising a nut spring configured to apply a second forward directed force on the nut to urge the nut into the disengaged position.

17. The chuck of claim 15, further comprising a nut spring configured to apply a rearward directed force on the nut to urge the nut into the engaged position.

18. The chuck of claim 15, further comprising a sleeve that is operably coupled to the nut, wherein the sleeve nests within a dust cover and the sleeve is configured to translate axially with the nut relative to the dust cover.

19. The chuck of claim 15, wherein each jaw operably couples to the push plate via a respective push plate slot.

20. The chuck of claim 19, wherein each jaw is configured to move within the respective push plate slot to change a size of the jaw opening.

* * * * *